US010023226B2

(12) United States Patent
Sakaguchi et al.

(10) Patent No.: US 10,023,226 B2
(45) Date of Patent: Jul. 17, 2018

(54) ELECTRIC POWER STEERING APPARATUS

(71) Applicant: NSK Ltd., Tokyo (JP)

(72) Inventors: Toru Sakaguchi, Maebashi (JP);
Toshikazu Onoe, Maebashi (JP);
Satoshi Shimokawabe, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/520,577

(22) PCT Filed: Dec. 24, 2015

(86) PCT No.: PCT/JP2015/085954
§ 371 (c)(1),
(2) Date: Apr. 20, 2017

(87) PCT Pub. No.: WO2016/104570
PCT Pub. Date: Jun. 30, 2016

(65) Prior Publication Data
US 2017/0334481 A1    Nov. 23, 2017

(30) Foreign Application Priority Data

Dec. 25, 2014   (JP) .................................. 2014-262244
Sep. 16, 2015   (JP) .................................. 2015-183272
(Continued)

(51) Int. Cl.
B62D 5/04      (2006.01)
B62D 3/12      (2006.01)
B62D 6/00      (2006.01)

(52) U.S. Cl.
CPC ............. B62D 5/0463 (2013.01); B62D 3/12 (2013.01); B62D 6/00 (2013.01)

(58) Field of Classification Search
None
See application file for complete search history.

(56) References Cited

U.S. PATENT DOCUMENTS 6,854,556 B1 *   2/2005   Yamamoto ............ B62D 5/043
                                                       180/443
2006/0037806 A1   2/2006   Kasahara et al.
(Continued)

FOREIGN PATENT DOCUMENTS

JP          06-004417 A     1/1994
JP       2004-345596 A     12/2004
(Continued)

OTHER PUBLICATIONS

International Preliminary Report on Patentability of PCT/JP2015/085954 dated Sep. 21, 2016.
(Continued)

Primary Examiner — Jonathan M Dager
Assistant Examiner — Garrett F Evans
(74) Attorney, Agent, or Firm — Sughrue Mion, PLLC

(57) ABSTRACT

[Problem] An object of the present invention is to provide an electric power steering apparatus that constitutes a control system based on a physical model, constitutes a model following control that an output (a distance to a rack end) of a controlled object follows-up to a reference model, suppresses the occurrences of a noisy sound and a shock force at an end hitting without giving any uncomfortable steering feeling to a driver, and is capable of smoothly steering.
[Means for solving the problem]
In the electric power steering apparatus that calculates a first current command value based on at least a steering torque and performs an assist-control of a steering system by driving a motor based on the first current command value, the apparatus comprises a configuration of a model following control comprising a feed-back control section including a viscoelastic model as a reference model within a predetermined angle at front of a rack end, wherein the configuration of the model following control comprises a feed-back
(Continued)

control section, and the model following control has a noise-reducing function to reduce a noise so as to suppress a rack end hitting.

38 Claims, 47 Drawing Sheets

(30) Foreign Application Priority Data

Sep. 16, 2015 (JP) ................................. 2015-183273
Nov. 13, 2015 (JP) ................................. 2015-223381

(56) References Cited

U.S. PATENT DOCUMENTS

| 2006/0080016 | A1 | 4/2006 | Kasahara et al. |
| 2007/0107978 | A1 | 5/2007 | Aoki et al. |
| 2007/0284180 | A1 | 12/2007 | Suehiro et al. |
| 2011/0303480 | A1* | 12/2011 | Shimizu ................... B62D 1/16 180/444 |
| 2015/0151787 | A1* | 6/2015 | Ohashi .................... B62D 3/12 280/93.511 |

FOREIGN PATENT DOCUMENTS

| JP | 2005-186926 A | 7/2005 |
| JP | 2005-335587 A | 12/2005 |
| JP | 2006-168481 A | 6/2006 |
| JP | 2008-030712 A | 2/2008 |
| JP | 4115156 B2 | 7/2008 |
| JP | 2008-201338 A | 9/2008 |
| JP | 2009-046030 A | 3/2009 |
| JP | 2014-133533 A | 7/2014 |
| WO | 2014/195625 A2 | 12/2014 |

OTHER PUBLICATIONS

International Search Report of PCT/JP2015/085954 dated Mar. 29, 2016.

* cited by examiner

PRIOR ART

FIRST EXAMPLE

ELECTRIC POWER STEERING APPARATUS

CROSS REFERENCE TO RELATED APPLICATIONS

This application is a National Stage of International Application No. PCT/JP2015/085954 filed Dec. 24, 2015, claiming priority based on Japanese Patent Application No. 2014-262244 filed Dec. 25, 2014, Japanese Patent Application No. 2015-183272 filed Sep. 16, 2015, Japanese Patent Application No. 2015-183273 filed Sep. 16, 2015, and Japanese Patent Application No. 2015-223381 filed Nov. 13, 2015, the contents of all of which are incorporated herein by reference in their entirety.

TECHNICAL FIELD

The present invention relates to an electric power steering apparatus that calculates a current command value based on at least a steering torque, drives a motor by using the current command value, and provides a steering system of a vehicle with an assist torque, and in particular to the electric power steering apparatus that sets a viscoelastic model as a reference (normative) model, decreases the assist torque by reducing the current command value near a rack end, decreases a striking energy by attenuating a force at an end hitting time, suppresses a hitting sound (a noisy sound) that a driver feels uncomfortable, and improves a steering feeling.

BACKGROUND ART

An electric power steering apparatus (EPS) which provides a steering system of a vehicle with an assist torque by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus performs a feed-back control of a motor current. The feed-back control adjusts a voltage supplied to the motor so that a difference between a current command value and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Th of the steering wheel 1, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value.

A controller area network (CAN) 40 to send/receive various information and signals on the vehicle is connected to the control unit 30, and it is also possible to receive the vehicle speed Vel from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a CPU (including an MPU and an MCU), and general functions performed by programs within the CPU are, for example, shown in FIG. 2.

Functions and operations of the control unit 30 will be described with reference to FIG. 2. The steering torque Th from the torque sensor 10 and the vehicle speed Vel from the vehicle speed sensor 12 are inputted into a torque control section 31 to calculate a current command value Iref1, and the calculated current command value Iref1 is inputted into a subtracting section 32B, where a detected motor current value Im is subtracted from the current command value Iref1. A deviation I (=Iref1−Im) which is the subtracted result in the subtracting section 32B is controlled in the current control section 35 such as a proportional-integral (PI) control and so on. The voltage control value Vref obtained by the current control is inputted into a PWM-control section 36 which calculates duty command values, and PWM-drives the motor 20 through an inverter circuit 37 by means of a PWM signal. The motor current value Im of the motor 20 is detected by a motor current detector 38, and is inputted and fed back to the subtracting section 32B. Further, a rotational angle sensor 21 such as a resolver is connected to the motor 20 and a steering angle θ is detected and outputted.

In such the electric power steering apparatus, when a large assist torque from the motor is applied to the steering system near the maximum steering angle (the rack end) thereof, a strong impact (a shock) occurs at a time when the steering system reaches at the maximum steering angle, and the driver may feel uncomfortable because of generating the hitting noise (noisy sound) due to the shock.

The electric power steering apparatus that includes a steering angle judging means for judging whether the steering angle of the steering system reaches at a front by a predetermined value from the maximum steering angle and a correcting means for correcting which decreases the assist torque by reducing the power supplied to the motor when the steering angle reaches at a front by a predetermined value from the maximum steering angle, is disclosed in Japanese Examined Patent Application Publication No. H6-4417 B2 (Patent Document 1).

Further, the electric power steering apparatus disclosed in Japanese Patent No. 4115156 B2 (Patent Document 2) is that: the electric power steering apparatus that judges whether an adjustment mechanism becomes near an end position or not, controls a driving means so as to decrease a steering assist when the adjustment mechanism reaches at near the end position, and evaluates an adjustment speed determined by a position sensor in order to determine the speed when the adjustment mechanism approaches to the end position.

THE LIST OF PRIOR ART DOCUMENTS

Patent Documents

Patent Document 1: Japanese Examined Patent Application Publication No. H6-4417 B2
Patent Document 2: Japanese Patent No. 4115156 B2

SUMMARY OF THE INVENTION

Problems to be Solved by the Invention

However, since the electric power steering apparatus disclosed in Patent Document 1 decreases the power when the steering angle reaches at a front by a predetermined value from the maximum steering angle and the steering velocity or the like is not entirely considered, it is impossible to perform a fine current-decreasing control. Patent Document 1 does not disclose the characteristics to decrease the assist torque of the motor and a concrete configuration is not shown.

Further, although the electric power steering apparatus disclosed in Patent Document 2 decreases an assist amount toward the end position, it adjusts the decreasing velocity of the assist amount in response to a velocity approaching to the end position and sufficiently falls down the speed at the end position. However, Patent Document 2 shows only to vary the characteristic changing in response to the speed and is not subjected based on a physical model. Furthermore, since Patent Document 2 does not perform the feed-back control, there is a fear that the characteristic or the result vary depending on a road surface condition (a load state).

The present invention has been developed in view of the above-described circumstances, and it is an object of the present invention is to provide a high-performance electric power steering apparatus that constitutes a control system based on a physical model, constitutes a model-following control that an output (a distance to a rack end) of a controlled object follows-up to an output of a reference model, eliminates or reduces the occurrences of a noisy sound and a shock force at an end hitting without giving any uncomfortable steering feeling to a driver, and attenuates the shock force.

Further, it is another object of the present invention is to provide an electric power steering apparatus being capable of further smoothly steering by suppressing uncomfortable vibrations that the driver successively feels by feeding-back the current command value or the controlled variable which is varied due to a minute torque variation or a motor angle variation, by not giving the uncomfortable feeling to the driver due to the change of the assist force at front and rear of the model following control or by being changeable the control range corresponding to the vehicle speed.

Means for Solving the Problems

The present invention relates to an electric power steering apparatus that calculates a first current command value based on at least a steering torque and performs an assist-control of a steering system by driving a motor based on the first current command value, the above-described object of the present invention is achieved by comprising: a first converting section to convert the first current command value to a first rack axial force; a rack position converting section to convert a rotation angle of the motor to a judgment rack position; a rack end approach judging section to judge that a steering approaches to a rack end based on the judgment rack position and to output a rack displacement and a switching signal; a viscoelastic model following control section to generate, with a configuration of a model following control, a second rack axial force including a viscoelastic model as a reference model based on the rack axial force, the rack displacement and the switching signal; and a second converting section to convert the second rack axial force to a second current command value; wherein the viscoelastic model following control section comprising: a feed-back control section to feed-back control based on the rack displacement and the first rack axial force and to output the second rack axial force; a switching section to switch-ON/OFF an output of the second rack axial force by the switching signal: and at least one noise reducing section to reduce a noise included in the rack displacement or the first rack axial force by a noise-reducing function: wherein the assist-control is performed by adding the second current command value to the first current command value so as to suppress a rack end hitting.

Further, the above-described object of the present invention is achieved by that: a first converting section to convert the first current command value to a first rack axial force; a rack position converting section to convert a rotational angle of the motor to a judgment rack position; a rack end approach judging section to judge that a steering approaches to a rack end based on the judgment rack position and to output a rack displacement and a switching signal; a viscoelastic model following control section to generate, with a configuration of a model following control, a second rack axial force including a viscoelastic model as a reference model based on the first rack axial force, the rack displacement and the switching signal; a change-amount limiting section to change the second rack axial force so that a change amount of the second rack axial force becomes the predetermined value when the change amount exceeds the predetermined value; and a second converting section to convert the second rack axial force to a second current command value; wherein the assist-control is performed by adding the second current command value to the first current command value so as to suppress a rack end hitting.

Furthermore, the above-described object of the present invention is achieved by comprising: a first converting section to convert the first current command value to a first rack axial force; a rack position converting section to convert a rotational angle of the motor to a judgement rack position; a rack end approach judging section to judge that a steering approaches to a rack end based on the judgment rack position and to output a rack displacement and a switching signal; a viscoelastic model following control section to generate, with a configuration of a model following control, a second rack axial force including a viscoelastic model as a reference model based on the rack axial force, the rack displacement and the switching signal; and a second converting section to convert the second rack axial force to a second current command value; wherein the viscoelastic model following control section comprising: a feed-back control section feed-back control based on the rack displacement and the first rack axial force and to output the third rack axial force; and a first switching section to switch-ON/Off an output of the third rack axial force by the switching signal; wherein an output from the first switching section is outputted as the second rack axial force, and the rack end approach judging section judges that a steering approaches the rack end by that the judging rack position is within a predetermined position at front of the rack end and changes the predetermined position corresponding to the vehicle speed, wherein the assist-control is performed by adding the second current command value to the first current command value so as to suppress a rack end hitting.

Effects of the Invention

Because the electric power steering apparatus according to the present invention constitutes a control system based on the physical model, it is possible to easily see daylight for a constant design. Since the present electric power steering apparatus constitutes the model following control so that the output (the distance to the rack end) of the controlled object follows-up to output of the reference model, the present invention has an advantage effect that a robust (tough) end-hitting suppressing-control becomes possible against variations of the load state (external disturbance) and the controlled object.

Further, according to the electric power steering apparatus of the present invention, it is possible to suppress uncomfortable vibrations that the driver feels by providing the noise reducing section at the feed-back route even if the current command value or the motor angle minutely varies.

Furthermore, it is possible to suppress that the driver feels the change of the steering torque, by setting the limitation of the change amount of the controlled output so as not to suddenly change the assist force due to the model following control.

It is also possible to perform a smooth steering corresponding to the state by changing the predetermined angle or the like at front of the rack end in accordance with the vehicle speed.

MODE FOR CARRYING OUT THE INVENTION

Figure 1:
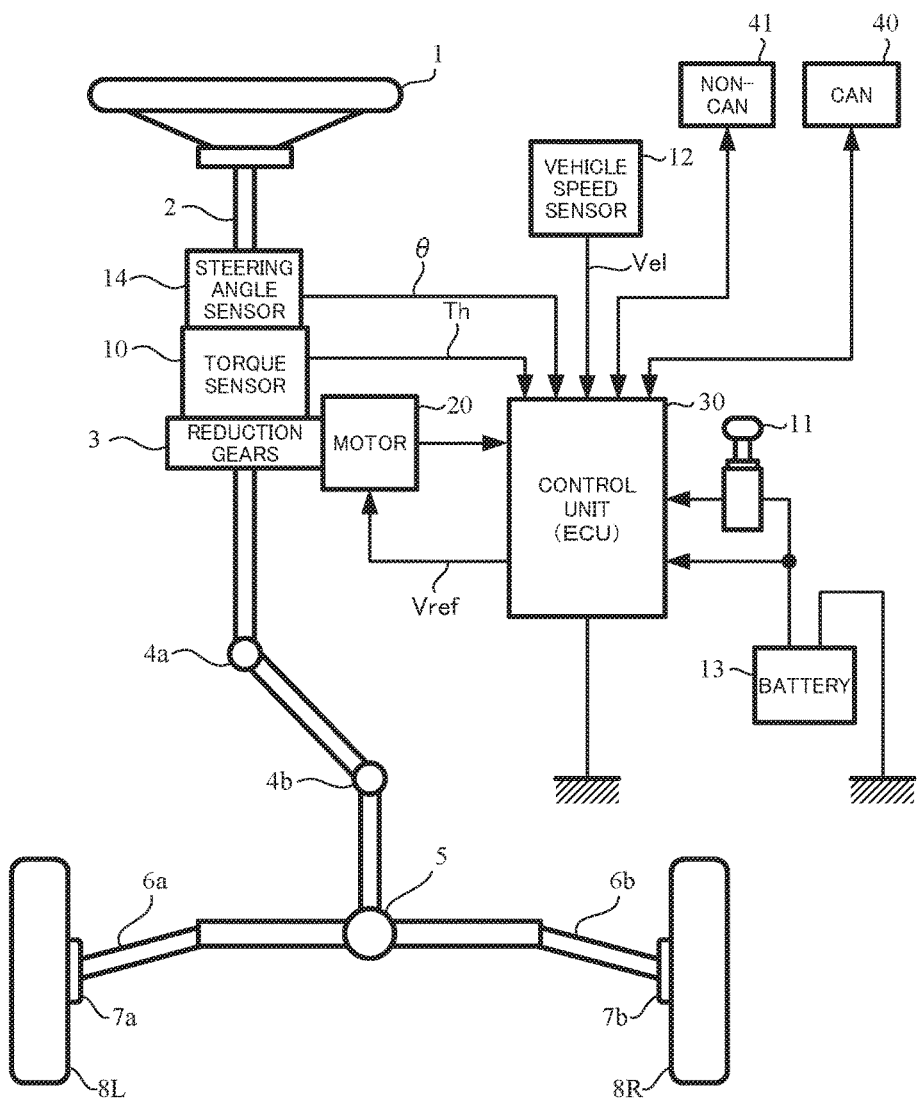
FIG. 1 is a configuration diagram illustrating a general outline of an electric power steering apparatus.

An electric power steering apparatus according to the present invention constitutes a control system based on a physical model near a rack end, sets a viscoelastic model (a spring constant and a viscous friction coefficient) as a reference (normative) model, constitutes a model following control so that an output (a distance to the rack end) of a controlled object follows-up to output of the reference model, suppresses an occurrence of a noisy sound at an end hitting time without giving a steering uncomfortable feeling to a driver, and attenuates a shock force.

The model following control comprises a viscoelastic model following control section. The viscoelastic model following control section comprises a feed-forward control section or a feed-back control section, or a combination thereof. The viscoelastic model following control section performs a normal assist-control out of a predetermined angle at front of the rack end, and performs the model-following control within the predetermined angle at front of the rack end so as to attenuate the shock force at a rack end hitting time.

Further, the present invention performs a processing (hereinafter, refer to a "noise reducing processing") for reducing vibrations (noises), a processing (hereinafter, refer to a "change-amount limiting processing") for suppressing a change amount of a controlled output and a processing (hereinafter, refer to a "start steering angle changing processing") for changing a determined angle at front of the rack end.

A noise reducing section is provided for suppressing vibrations (noises) generated due to a minute change of the current command value or a minute change of the motor angle in the noise reducing processing. Since these changes are fed-back through a viscoelastic model following control section and the vibrations continue, the noise reducing section is provided within the viscoelastic model following control section. Since the driver especially feels a high frequency vibration as an uncomfortable vibration, the noise reducing section has a characteristic to reduce high frequency components. The characteristic of the noise reducing section changes corresponding to a steering velocity information such as a motor angular velocity, a rack displacement velocity and so on. That is, a time that the driver feels the uncomfortable vibration is a steering holding or a slow steering, therefore the characteristic is set so that a noise suppressing effect is large when the steering velocity information is small. Alternatively, since an effect of preventing the end hitting is fade away if the control responsibility is not raised when the steering velocity information is large, the characteristic is adjusted so that a noise suppressing effect becomes small. Further, there is a fear that the vibration is transmitted to the driver as the uncomfortable when the characteristic of the noise reducing section drastically changes and the motor torque rapidly changes. Consequently, the characteristic is gradually adjusted corresponding to the change of the steering velocity information so as not to drastically change.

In the change-amount limiting processing, the change amount of the controlled variable changed by the model following control is suppressed so that the assist amount does not drastically change at a start time of the model following control and a turn back time to a normal steering and the driver does not feel the change of the steering torque. Concretely, the change-amount limiting section traces an output from the viscoelastic model following control section equivalent to the controlled variable and changes the output so that the change amount becomes a predetermined value when the change amount of the output exceeds the predetermined value. It is also possible to suppress the rapid change of the assist force by adjusting the parameters for calculating the current command value. However, obtaining the suitable parameters among various factors such as steering velocity, tires, a road surface state and so on is less the degree of freedom for the adjustment, and there is a possibility to takes much time to adjust. Therefore, the present invention aims to enhance the degree of freedom for the adjustment and to save the adjusting time by limiting the controlled variable related to the assist force. The predetermined value used in the change-amount limiting section is changed between a neighborhood of a predetermined angle at front of the rack end to start or end the model following control and a neighborhood of the rack end, and is greatly set at the neighborhood of the rack end. At the neighborhood of the rack end, the predetermined value is greatly set not to over suppress the change amount of the output from the viscoelastic model following control section in order to prevent the noisy sound occurrence at the end hitting time which is the first object. At the neighborhood of the predetermined angle at front of the rack end, the predetermined value is small set in a scope as possible in order to suppress the rapid change of the assist force. In this connection, the predetermined value is changed based on the steering information such as the rack displacement, the rotational angle of the motor, the steering angle and so on. That is, since the steering approaches the rack end as the value of the steering information becomes large, the predetermined value is greatly set. Further, the directions (±) of the change of the output of the viscoelastic model following control section are usually inverse when the steering enters in the region of the predetermined value at front of the rack end and goes out therefrom. Accordingly, different predetermined values are used at the entering time and the going out time and more flexible adjustment is capable by changing the output in accordance with the direction of the output.

In the start steering angle changing processing, the predetermined angle (the start steering angle) at front of the rack end is changed corresponding to the vehicle speed. Since the position of the rack end is fixed, a control range (a range performing the model following control) varies by changing the start steering angle. For example, it is possible to prevent a torsion bar hitting as possible due to a soft steering torque change by enlarging the control range at the parking. It is possible to enlarge the steering angle range without the steering change by reducing the control range at a very slow vehicle speed (e.g. creeping) or more. Further, it is also possible to realize a smooth and soft control by changing the reference model, parameters (hereinafter, refer to "model parameters") of the reference model and the control parameters of the feed-back control section corresponding to the vehicle speed. Concretely, a reference model, the model parameters and the control parameters are prepared at a vehicle standstill (including a parking time) and a vehicle running respectively, they are shifted between the standstill and the running corresponding to the vehicle speed.

Hereinafter, embodiments of the present invention will be described with reference to the accompanying drawings.

Figure 2:
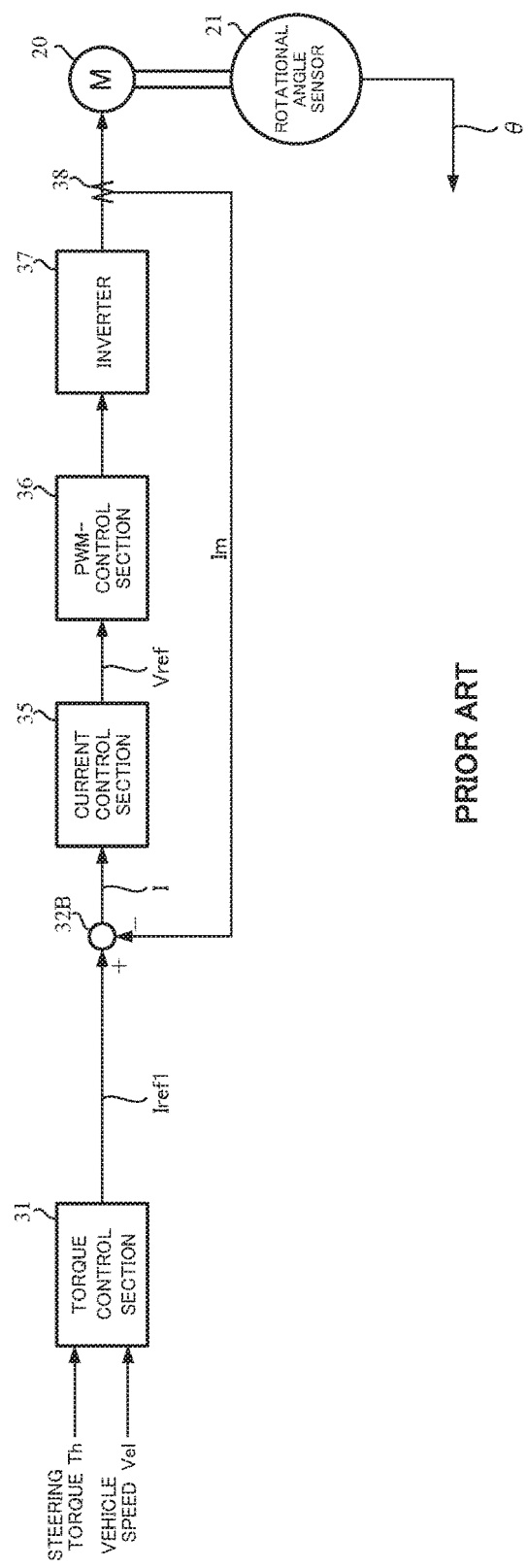
FIG. 2 is a block diagram showing a general configuration example of a control system of the electric power steering apparatus.

First, the model-following control which is essential of the present invention is described with reference to FIG. 3 corresponding to FIG. 2.

Figure 3:
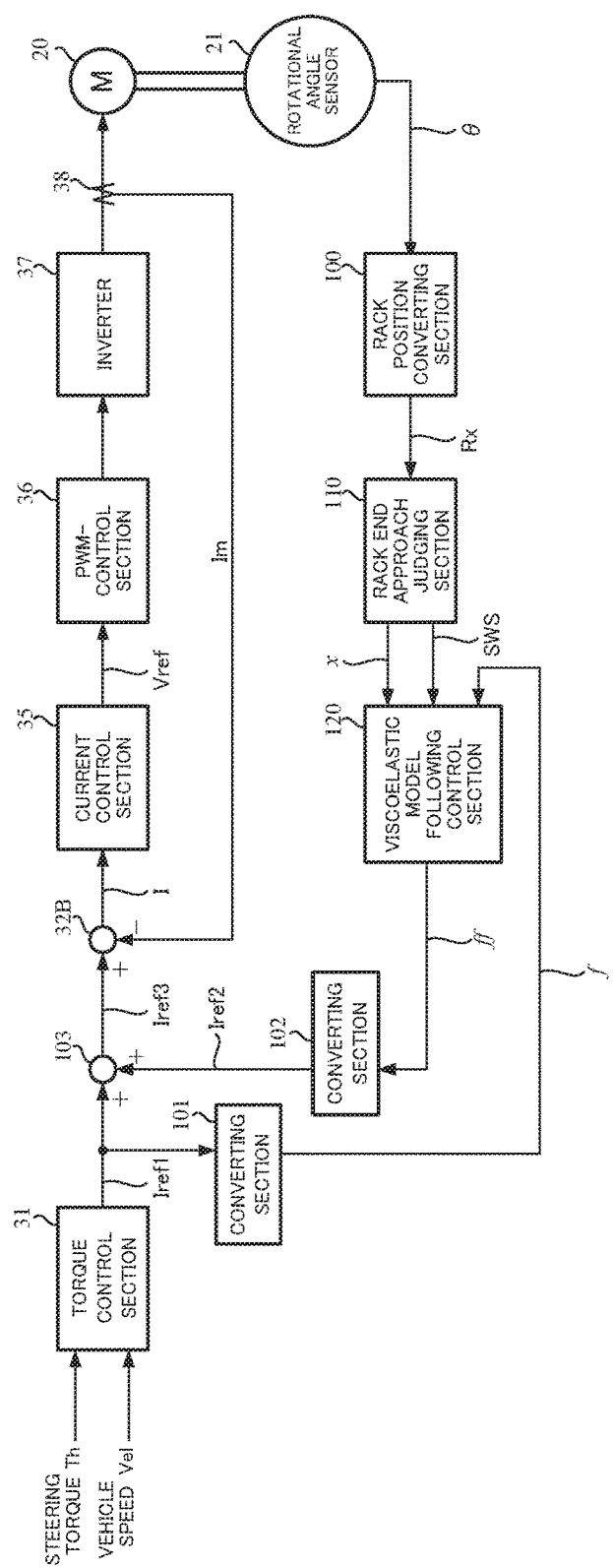
FIG. 3 is a block diagram showing a configuration example of the present invention.

In the model-following control shown in FIG. 3, a current command value Iref1 is converted to the rack axial force f in the converting section 101, and the rack axial force f is inputted into a viscoelastic model following control section 120. Although the rack axial force f is equivalent to a column shaft torque, the column shaft torque is conveniently considered as the rack axial force in the following description. The same configurations as FIG. 2 are denoted by the same reference numerals and the explanations are omitted.

A conversion from the current command value Iref1 to the rack axial force f is performed based on the below Equation 1.

$$f = G1 \times Iref1 \quad \text{[Equation 1]}$$

where, Kt is a torque constant [Nm/A], Gr is a reduction ratio, Cf is a stroke ratio [m/rev.], and G1=Kt×Gr×(2π/Cf).

Figure 4:
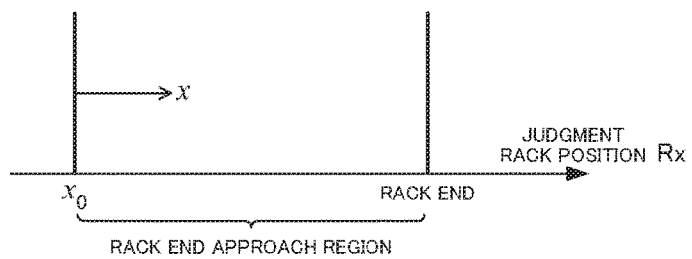
FIG. 4 is a diagram showing a characteristic example of a rack position converting section.

A rotational angle θ from a rotational angle sensor 21 is inputted into a rack position converting section 100 and is converted to a judgement rack position Rx. The judgement rack position Rx is inputted into a rack end approach judging section 110. As shown in FIG. 4, the rack end approach judging section 110 activates an end-hitting suppressing control function and outputs the rack displacement x and a switching signal SWS when the judgement rack position Rx is judged within a predetermined position $x_0$. The switching signal SWS and the rack displacement x are inputted into the viscoelastic model following control section 120 together with the rack axial force f. A rack axial force ff, which is control-calculated in the viscoelastic model following control section 120, is converted to the current command value Iref2 in a converting section 102. The current command value Iref2 is added to the current command value Iref1 in an adding section 103, and the added value is obtained as a current command value Iref3. The above described assist-control is performed based on the current command value Iref3.

As well, the predetermined position $x_0$ which sets a rack end approach region as shown in FIG. 4 enables to set an appropriate position. The predetermined position $x_0$ is not determined uniquely by using a rack ratio stroke, type of a vehicle, a feeling or the like, and normally sets at a front of the rack end whose range is 1 [mm] to 50 [mm]. Further, although the rotational angle θ is obtained from the rotational sensor which is coupled to the motor, the rotational angle θ may be obtained from the steering angle sensor.

The conversion from the rack axial force ff to the current command value Iref2 in the converting section 102 is performed based on the Equation 2.

$$Iref2 = ff/G1 \quad \text{[Equation 2]}$$

Figure 5:
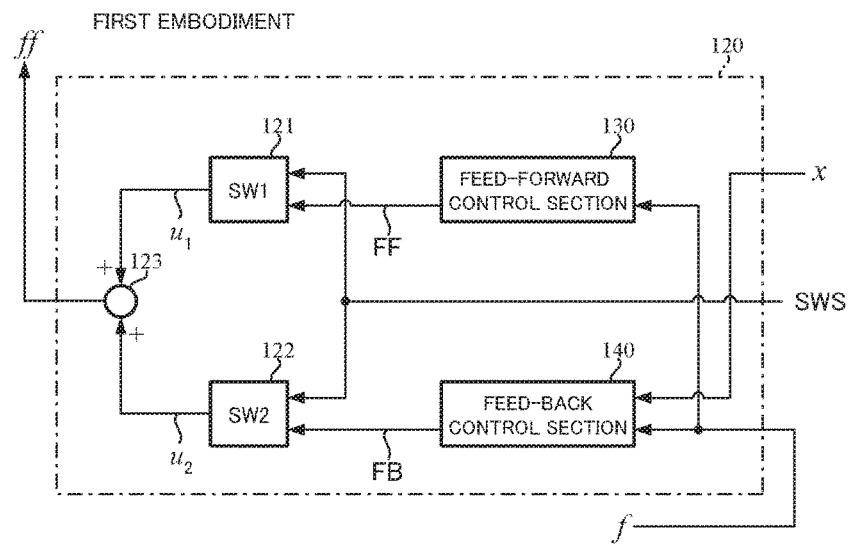
FIG. 5 is a block diagram showing a configuration example (the first embodiment) of a viscoelastic model following control section according to the present invention.
Figure 6:
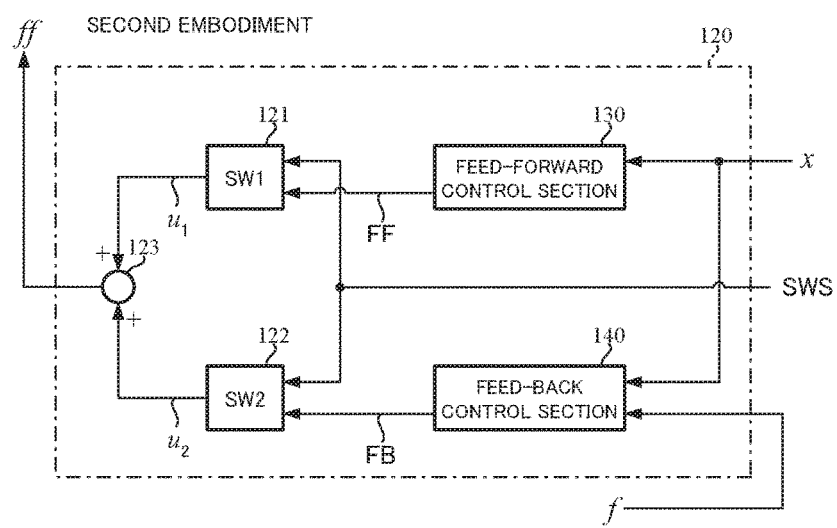
FIG. 6 is a block diagram showing a configuration example (the second embodiment) of a viscoelastic model following control section according to the present invention.

The detail of the viscoelastic model following control section 120 is shown in FIG. 5 or FIG. 6.

In the first embodiment shown in FIG. 5, the rack axial force f is inputted into a feed-forward control section 130 and a feed-back control section 140, and the rack displacement x is inputted into the feed-back control section 140. A rack axial force FF from the feed-forward control section 130 is inputted into a switching section 121, and a rack axial force FB from the feed-back control section 140 is inputted into a switching section 122. The switching sections 121 and 122 are switched-ON or -OFF by the switching signal SWS. When the switching sections 121 and 122 are switched-OFF by the switching signal SWS, each of outputs $u_1$ and $u_2$ is zero. When the switching sections 121 and 122 are switched-ON by the switching signal SWS, the rack axial force FF from the switching section 121 is outputted as a rack axial force $u_1$ and the rack axial force FB from the switching section 122 is outputted as a rack axial force $u_2$. The rack axial forces $u_1$ and $u_2$ from the switching section 121 and 122 are added in the adding section 123, and a rack axial force of the added value ff is outputted from the viscoelastic model following control section 120. The rack axial force ff is converted to the current command value Iref2 in the converting section 102.

Further, in the second embodiment shown in FIG. 6, the rack displacement x is inputted into a feed-forward control section 130 and a feed-back control section 140, and the rack axial force f is inputted into the feed-back control section 140. The following process is the same as that of the first embodiment, the rack axial force FF from the feed-forward control section 130 is inputted into the switching section 121, and the rack axial force FB from the feed-back control section 140 is inputted into the switching section 122. The switching sections 121 and 122 are switched-ON or -OFF by the switching signal SWS. When the switching sections 121 and 122 are switched-OFF by the switching signal SWS, each of outputs $u_1$ and $u_2$ is zero. When the switching sections 121 and 122 are switched-ON by the switching signal SWS, the rack axial force FF from the switching section 121 is outputted as the rack axial force $u_1$ and the rack axial force FB from the switching section 122 is outputted as the rack axial force $u_2$. The rack axial forces $u_1$ and $u_2$ from the switching section 121 and 122 are added in the adding section 123, and a rack axial force of the added value ff is outputted from the viscoelastic model following control section 120. The rack axial force ff is converted to the current command value Iref2 in the converting section 102.

In the above structures, an overall operation example is described with reference to a flowchart of FIG. 7, and then an operation example of the viscoelastic model following control (the first and second embodiments) is described with reference to a flowchart of FIG. 8.

In a start stage, the switching sections 121 and 122 are switched-OFF by the switching signal SWS. When the operation is started, the torque control section 31 calculates the current command value Iref1 based on the steering torque Th and the vehicle speed Vel (Step S10), and the rack position converting section 100 converts the rotational angle θ from the rotational angle sensor 21 to the judgement rack position Rx (Step S11). The rack end approach judging section 110 judges whether the rack position approaches near the rack end based on the judgement rack position Rx (Step S12). In a case that the rack position is not near the rack end, the rack axial force ff from the viscoelastic model following control section 120 is not outputted and normal steering control based on the current command value Iref1 is performed (Step S13). This control is continued to the end (Step S14).

On the other hand, in a case that the rack position is near the rack end, the viscoelastic model following control is performed in the viscoelastic model following control section 120 (Step S20). As shown in FIG. 8, the rack end approach judging section 110 outputs the switching signal SWS (Step S201) and the rack displacement x (Step S202). The converting section 101 converts the current command value Iref1 to the rack axial force f by using the Equation 1 (Step S203). In the first embodiment shown in FIG. 5, the feed-forward control section 130 performs the feed-forward control based on the rack axial force f (Step S204), and the feed-back control section 140 performs the feed-back control based on the rack displacement x and the rack axial force f (Step S205). Further, in the second embodiment shown in FIG. 6, the feed-forward control section 130 performs the feed-forward control based on the rack displacement x (Step S204), and the feed-back control section 140 performs the feed-back control based on the rack displacement x and the rack axial force f (Step S205). In both cases, the order of the feed-forward control and the feed-back control may be alternated.

The switching signal SWS from the rack end approach judging section 110 is inputted into the switching sections 121 and 122, and the switching sections 121 and 122 are switched-ON (Step S206). When the switching sections 121 and 122 are switched-ON, the rack axial force FF from the feed-forward control section 130 is outputted as the rack axial force $u_1$ and the rack axial force FB from the feed-back control 140 is outputted as the rack axial force $u_2$. The rack axial forces $u_1$ and $u_2$ are added in the adding section 123 (Step S207), and then the rack axial force ff which is the added result is converted to the current converting value Iref2 in the converting section 102 by using the Equation 2 (Step S208).

The viscoelastic model following control section 120 according to the present invention is a control system based on the physical model near the rack end, constitutes the model-following control which sets the viscoelastic model (a spring constant $k_0$ [N/m] and a viscous friction coefficient μ [N/(m/s)]) as the reference model (input: a force and output: the physical model which is described in the displacement), and attenuates the shock force at a time to hit to the rack end.

Figure 9:
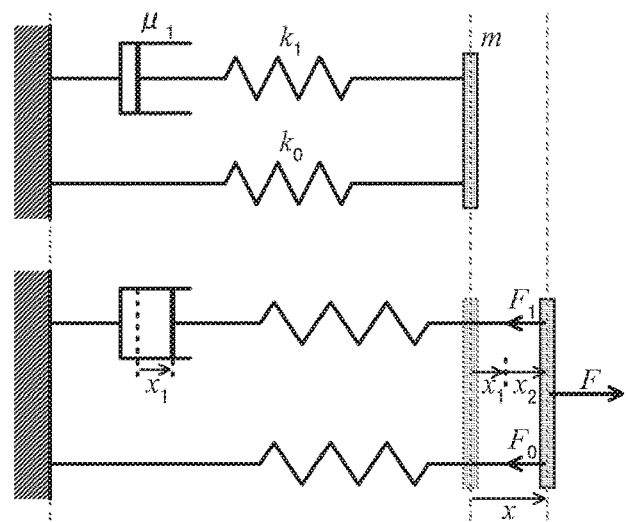
FIG. 9 is a schematic diagram of the viscoelastic model.

FIG. 9 is a schematic diagram near the rack end, and a relationship between mass m and forces $F_0$ and $F_1$ is represented by the Equation 3. The derivation of the equations of the viscoelastic model is described in, for example, "Elementary Mechanics for Elastic Membrane and Viscoelasticity" (Kenkichi OHBA) of "Engineering Sciences & Technology", Kansai University, official journal of a scientific society, Vol. 17 (2010).

$$F = m\ddot{x} + F_0 + F_1 \quad \text{[Equation 3]}$$

Assuming that spring constants $k_0$ and $k_1$ are defined for the rack displacements $x_1$ and $x_0$, respectively, and then the below Equations 4 to 6 are established.

$$x = x_1 + x_2 \quad \text{[Equation 4]}$$

$$F_0 = k_0 x \quad \text{[Equation 5]}$$

$$F_1 = \mu_1 \frac{dx_1}{dt} = k_1 x_2 \quad \text{[Equation 6]}$$

Therefore, the Equation 7 is obtained by substituting the Equation 4 to 6 into the Equation 3.

$$\begin{aligned} F &= m\ddot{x} + k_0 x + k_1 x_2 \\ &= m\ddot{x} + k_0 x + k_1(x - x_1) = m\ddot{x} + (k_0 + k_1)x - k_1 x_1 \end{aligned} \quad \text{[Equation 7]}$$

The Equation 8 is a result that the Equation 7 is differentiated, and then the Equation 9 is obtained by which the Equation 8 multiplies "$\mu_1/k_1$".

$$\dot{F} = m\dddot{x} + (k_0 + k_1)\dot{x} - k_1 \dot{x}_1 \quad \text{[Equation 8]}$$

$$\frac{\mu_1}{k_1}\dot{F} = \frac{\mu_1}{k_1}m\dddot{x} + \frac{\mu_1}{k_1}(k_0 + k_1)\dot{x} - \mu_1 \dot{x}_1 \quad \text{[Equation 9]}$$

Then, the Equation 10 is obtained by adding the Equations 7 and 9.

$$F + \frac{\mu_1}{k_1}\dot{F} = \quad \text{[Equation 10]}$$
$$m\ddot{x} + \frac{\mu_1}{k_1}m\dddot{x} + (k_0 + k_1)x - k_1 x_1 + \frac{\mu_1}{k_1}(k_0 + k_1)\dot{x} - \mu_1 \dot{x}_1$$

The Equation 11 is obtained by substituting the Equations 4 and 6 to the Equation 10.

$$F + \frac{\mu_1}{k_1}\dot{F} = m\ddot{x} + \frac{\mu_1}{k_1}m\dddot{x} + k_0 x + \mu_1(1 + k_0/k_1)\dot{x} \quad \text{[Equation 11]}$$

Here, $\mu_1/k_1 = \tau_e$, $k_0 = E_r$, and $\mu_1(1/k_0 + 1/k_1) = \tau_\delta$ are assumed, the Equation 11 can be expressed by the Equation 12. The Equation 13 is obtained by performing Laplace transform to the Equation 12.

$$F + \tau_e \dot{F} = \tau_e m\dddot{x} + m\ddot{x} + E_r(x + \tau_\delta \dot{x}) \quad \text{[Equation 12]}$$

$$(1 + \tau_e s)F(s) = \{\tau_e m s^3 + m s^2 + E_r(1 + \tau_\delta s)\}X(s) \quad \text{[Equation 13]}$$

The Equation 14 is obtained by summarizing the Equation 13 with "X(s)/F(s)".

$$\frac{X(s)}{F(s)} = \frac{1 + \tau_e s}{\tau_e m s^3 + m s^2 + E_r(1 + \tau_\delta s)} \quad \text{[Equation 14]}$$

The Equation 14 represents a third order physical model (transfer function) which indicates the characteristic from the input force f to the output displacement x. When the spring with the spring constant "$k_1=\infty$" is used, "$\tau_e \to 0$" is satisfied. Because of "$\tau_\delta = \mu_1 \cdot 1/k_0$", the Equation 15 which is a quadratic function is derived.

$$\frac{X(s)}{F(s)} = \frac{1}{m \cdot s^2 + \mu_1 \cdot s + k_0} \quad \text{[Equation 15]}$$

The quadratic function represented by the Equation 15 as the reference model Gm is described in the present invention. That is, a function represented by the Equation 16 is the reference model Gm. Here, "$\mu_1$" is equal to $\mu$ ($\mu_1=\mu$).

$$Gm = \frac{1}{m \cdot s^2 + \mu \cdot s + k_0} \quad \text{[Equation 16]}$$

Next, an actual plant 146 of the electric power steering apparatus is represented by "P" which is denoted by the Equation 17. Then, when the reference model following control according to the present invention is designed by a two-degree-of-freedom control system, the system is a configuration of FIG. 10 expressed as actual models Pn and Pd. A block 143 (Cd) shows a control element section. (refer to, for example, Hajime MAEDA and Toshiharu SUGIE, "System Control Theory for Advanced Control", published by Asakura Shoten in Japan)

$$P = \frac{Pn}{Pd} = \frac{N}{D} = \frac{1}{m \cdot s^2 + \eta \cdot s} \quad \text{[Equation 17]}$$

In order to express the actual plant P with a ratio of a stable rational function, N and D are represented by the below Equation 18. A numerator of "N" is that of "P", and a numerator of "D" is a denominator of "P". However, "$\alpha$" is determined such that a pole of "$(s+\alpha)=0$" can be selected arbitrary.

$$N = \frac{1}{(s+\alpha)^2}, \quad D = \frac{m \cdot s^2 + \eta \cdot s}{(s+\alpha)^2} \quad \text{[Equation 18]}$$

When the reference model Gm is applied to the configuration of FIG. 10, it is necessary to set "1/F" as the below Equation 19 in order to satisfy "x/f=Gm". As well, the Equation 19 is derived from the Equations 16 and 18.

$$\frac{1}{F} = GmN^{-1} = \frac{(s+\alpha)^2}{m \cdot s^2 + \mu \cdot s + k_0} \quad \text{[Equation 19]}$$

A block N/F of the feed-back control section is represented by the below Equation 20.

$$\frac{N}{F} = \frac{1}{m \cdot s^2 + \mu \cdot s + k_0} \quad \text{[Equation 20]}$$

A block D/F of the feed-forward control section is represented by the below Equation 21.

$$\frac{D}{F} = \frac{m \cdot s^2 + \eta \cdot s}{m \cdot s^2 + \mu \cdot s + k_0} \quad \text{[Equation 21]}$$

In an example of the two-degree-of-freedom control system shown in FIG. 10, an input (the current command value corresponding to the rack axial force or the column axial torque) u to the actual plant P is represented by the below Equation 22.

$$u = u_1 + u_2 = \frac{D}{F}f + C_d e = \frac{D}{F}f + \left(\frac{N}{F}f - x\right)C_d \quad \text{[Equation 22]}$$

Further, an output (the rack displacement) x of the actual plant P is represented by the below Equation 23.

$$x = uP = P\frac{D}{F}f + P\left(\frac{N}{F}f - x\right)C_d = P\frac{D}{F}f + P\frac{N}{F}C_d f - PC_d x \quad \text{[Equation 23]}$$

When the Equation 23 is summarized and arranged the term of the output x to the left-hand side and the term of f to the right-hand side, the below Equation 24 is derived.

$$(1 + PC_d)x = P\left(\frac{D}{F} + \frac{N}{F}C_d\right)f \quad \text{[Equation 24]}$$

The below Equation 25 is obtained by expressing the Equation 24 as the transfer function of the output x against the input f. Here, the actual plant P is expressed as "P=Pn/Pd" after the third term.

$$\frac{x}{f} = \frac{P\left(\frac{D}{F} + \frac{N}{F}C_d\right)}{1 + PC_d} = \frac{\frac{Pn}{Pd}\left(\frac{D}{F} + \frac{N}{F}C_d\right)}{1 + \frac{Pn}{Pd}C_d} = \frac{\frac{D}{F} + \frac{N}{F}C_d}{\frac{Pd}{Pn} + C_d} = \frac{Pn}{F} \cdot \frac{NC_d + D}{PnC_d + Pd} \quad \text{[Equation 25]}$$

If the actual plant P is correctly expressed, it is possible to obtain the relations "Pn=N" and "Pd=D". The below Equation 26 is obtained from the Equation 25 since the characteristics of the output x against the input f is represented as "Pn/F (=N/F)".

$$\frac{x}{f} = \frac{Pn}{F} \cdot \frac{PnC_d + Pd}{PnC_d + Pd} = \frac{Pn}{F} \quad \text{[Equation 26]}$$

The characteristic of the output x against the input f (the reference model (the transfer function)) is considered as the Equation 27.

$$\frac{x}{f} = \frac{\omega_n^2}{s + 2\zeta\omega_n s + \omega_n^2} \quad \text{[Equation 27]}$$

It is possible to achieve the Equation 26 by putting "1/F" to the below Equation 28.

$$\frac{1}{F} = \frac{\omega_n^2}{s + 2\zeta\omega_n s + \omega_n^2} Pn^{-1} \quad \text{[Equation 28]}$$

Figure 10:
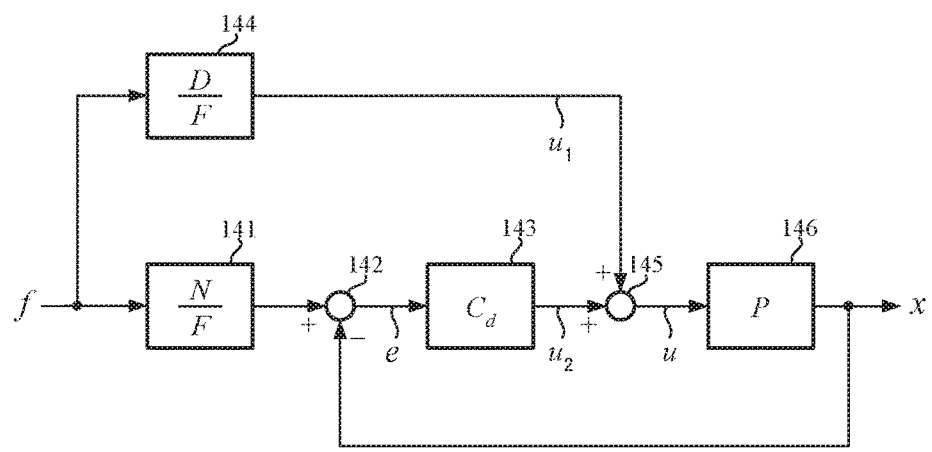
FIG. 10 is a block diagram showing detailed principle of the viscoelastic model following control section.
Figure 11A:
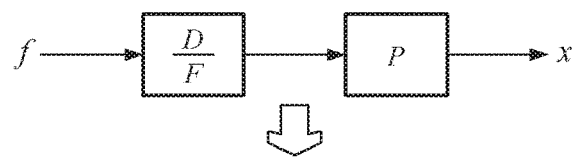
FIGS. 11A, 11B and 11C are block diagrams showing detailed principle of the viscoelastic model following control section.
Figure 11B:
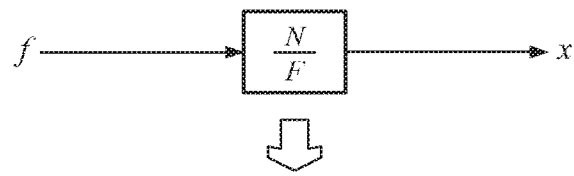
Figure 11C:
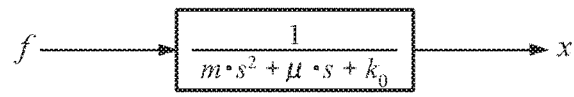

In FIG. 10, when the feed-forward control system is considered as a path of "a block 144→the actual plant P", this system is expressed as FIGS. 11A, 11B and 11C. Here, considering P as N/D (P=N/D), FIG. 11A can be expressed as FIG. 11B, and then FIG. 11C is obtained by using the Equation 20. Since an equation "f=(m·s$^2$+μ·s+k$_0$)x" is satisfied from FIG. 11C, the below Equation 29 is obtained by performing an inverse Laplace transform to the equation "f=(m·s$^2$+μ·s+k$_0$)x".

$$f = m\ddot{x} + \mu\dot{x} + k_0 x \quad \text{[Equation 29]}$$

Figure 12:
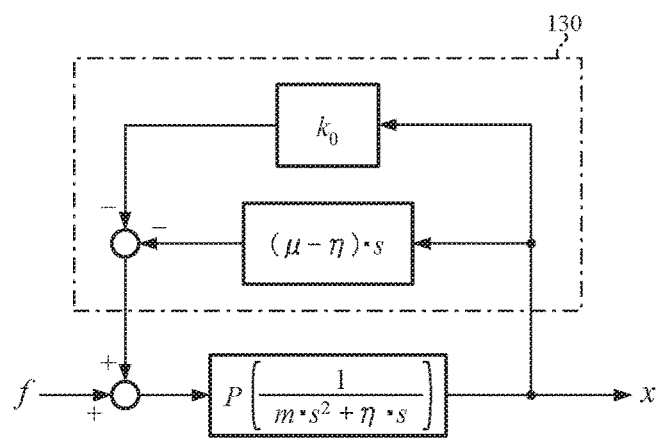
FIG. 12 is a block diagram showing detailed principle of the viscoelastic model following control section.

On the other hand, considering a transfer function block of the feed-forward control system as shown in FIG. 12, the below Equation 30 is satisfied in the input f and the output x.

$$\{f - (\mu - \eta) \cdot s \cdot x - k_0 x\} \frac{1}{m \cdot s^2 + \eta \cdot s} = x \quad \text{[Equation 30]}$$

The below Equation 31 is obtained by summarizing the Equation 30, and the below Equation 32 is derived by summarizing the Equation 31 with respect to the input f.

$$f - \{(\mu-\eta)\cdot s + k_0\}\cdot x = (m\cdot s^2 + \eta\cdot s)x \quad \text{[Equation 31]}$$

$$f = \{m\cdot s^2 + (\mu-\eta+\eta)\cdot s + k_0\}\cdot x \quad \text{[Equation 32]}$$

Figure 13:
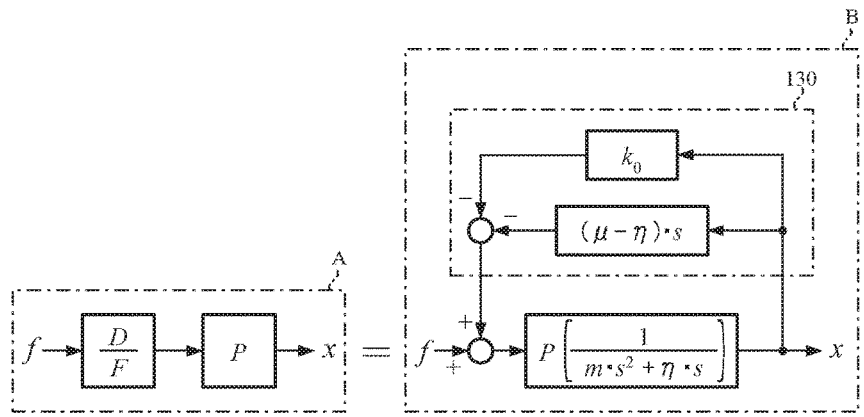
FIG. 13 is a block diagram showing detailed principle of the viscoelastic model following control section.

The above Equation 29 is obtained by performing the inverse Laplace transform on the Equation 32. Consequently, the feed-forward control sections A and B are equivalent each other as shown in FIG. 13.

Considering the above-described premise, concrete configuration examples of the present invention will be described with reference to FIG. 14 and FIG. 15. The first example of FIG. 14 corresponds to the first embodiment of FIG. 5, the rack axial force f is inputted into the feed-forward element 144 ("D/F" expressed by the above Equation 21) in the feed-forward control section 130 and the feed-back control section 140, the rack displacement x is inputted into the feed-back control section 140. Further, the second example of FIG. 15 corresponds to the second embodiment of FIG. 6, the rack displacement x is inputted into the spring constant term 131 and the viscous friction coefficient term 132 in the feed-forward control section 130, the rack axial force f is inputted into the feed-back control section 140.

Figure 14:
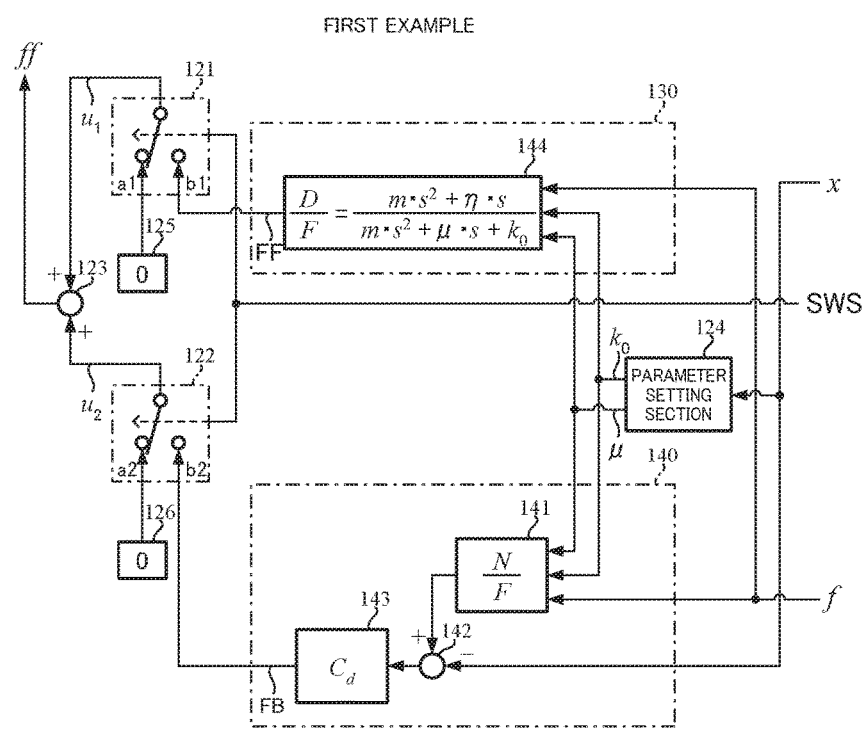
FIG. 14 is a block diagram showing a detailed configuration example (the first example) of the viscoelastic model following control section.

In the first example of FIG. 14, the rack axial force FF is inputted into a contact point b1 of the switching section 121. Further, in the second example of FIG. 15, outputs from the spring constant term 131 and the viscous friction coefficient term 132 are subtracted at the subtracting section 133, the rack axial force FF being a subtracted result is inputted into a contact point b1 of the switching section 121. A fixed value "0" from the fixing section 125 is inputted into a contact point a1 of the switching section 121.

Figure 15:
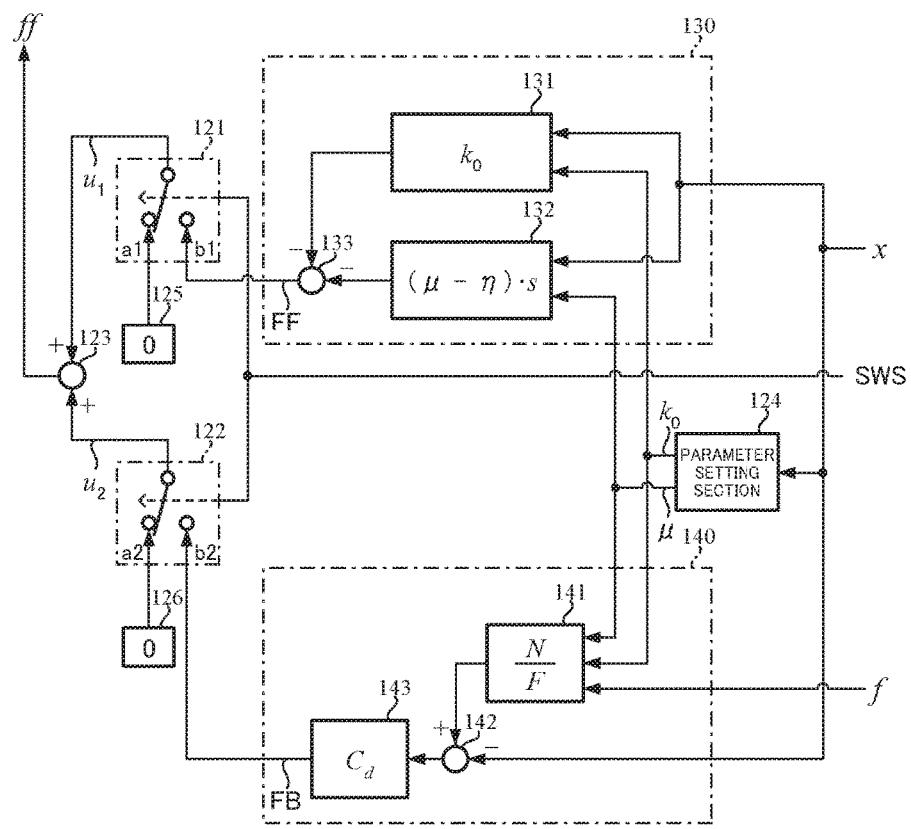
FIG. 15 is a block diagram showing a detailed configuration example (the second example) of the viscoelastic model following control section.

In any cases of the first example of FIG. 14 and the second example of FIG. 15, the feed-back control section 140 comprises the feed-back element (N/F) 141, the subtracting section 142 and the control element section 143, the rack axial force FB from the feed-back control section 140, i.e. an output of the control element section 143 is inputted into a contact point b2 of the switching section 122. A fixed value "0" from the fixing section 126 is inputted into a contact point a2 of the switching section 122.

Figure 16:
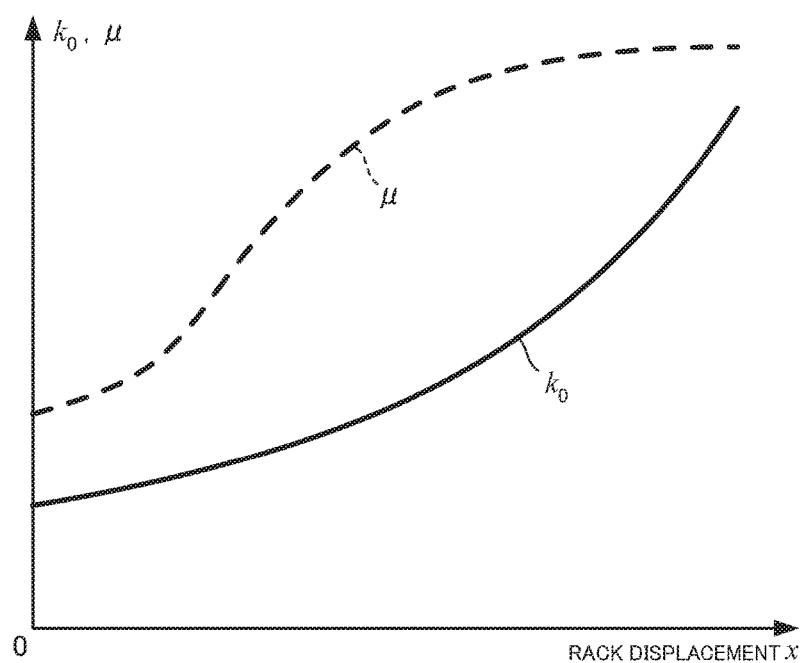
FIG. 16 is a diagram showing an example of changing parameters of a reference model depending on a rack position.

In the first example of FIG. 14, the rack axial force f is inputted into the feed-forward element 144 in the feed-forward control section 130 and the feed-back element (N/F) 141 in the feed-back control section 140. The rack displacement x is subtracting-inputted into the subtracting section 142 in the feed-back control section 140 and the parameter setting section 124. The parameter setting section 124 outputs the spring constant k$_0$ and the viscous friction coefficient μ against the rack displacement x with the characteristics as shown in FIG. 16, and the spring constant k$_0$ and the viscous friction coefficient μ are inputted into the feed-forward element 144 in the feed-forward control section 130 and the feed-back element (N/F) 141 in the feed-back control section 140.

In the second example of FIG. 15, the rack displacement x is inputted into the spring constant term 131 and the viscous friction coefficient term 132 in the feed-forward control section 130 and the subtracting section 142 in the feed-back control section 140 as well as the parameter setting section 124. The rack axial force f is inputted into the feed-back element (N/F) 141. The parameter setting section 124 outputs the spring constant k$_0$ and the viscous friction coefficient μ against the rack displacement x as described-above, and the spring constant k$_0$ is inputted into the spring constant term 131 and the feed-back element (N/F) 141 and the viscous friction coefficient μ is inputted into the viscous friction coefficient term 132 and the feed-back element (N/F) 141.

Further, the switching signal SWS is inputted into the switching sections 121 and 122 in any cases of the first and second examples, the contact points of the switching sections 121 and 122 are normally connected to the contact points a1 and a2, and the contact points are respectively switched to contact points b1 and b2 by the switching signal SWS.

In such the configuration, the operation example of the second example of FIG. 15 will be described with reference to a flowchart of FIG. 17.

When the switching signal SWS is outputted from the rack end approach judging section 110 (Step S21), and the rack displacement x is outputted (Step S22). The rack displacement x is inputted into the spring constant term 131, the viscous friction coefficient term 132, the parameter setting section 124 and subtracting section 142. The parameter setting section 124 sets the spring constant k$_0$ and the viscous friction coefficient μ in the spring constant term 131, the viscous friction coefficient term 132 and the feed-back element (N/F) 141 in accordance with the characteristics shown in FIG. 16 (Step S23). Further, the converting section 101 converts the current command value Iref1 to the rack axial force f (Step S23A), and the rack axial force f is inputted into the feed-back element (N/F) 141 and then is N/F-calculated (Step S24). The N/F-calculated value is adding-inputted into the subtracting section 142 and the rack displacement x is subtracted (Step S24A), and the subtracted value is Cd-calculated in the control element section 143

(Step S24B). Then, the calculated rack axial force FB is outputted from the control element section 143, and is inputted into the contact point b2 of the switching section 122.

The viscous friction coefficient term 132 in the feed-forward control section 130 calculates "(μ−η)·s" based on the viscous friction coefficient μ (Step S25), and sets the spring constant $k_0$ in the spring constant term 131 (Step S25A). Then, the subtraction between the output of the spring constant $k_0$ element and the output of "(μ−η)·s" element is performed at the subtracting section 133 (Step S25B), and the rack axial force FF as the subtracted result is outputted. The rack axial force FF is inputted into the contact point b1 of the switching section 121. As well, the calculation order of the feed-forward control section 130 and the feed-back control section 140 is alternative.

The switching signal SWS from the rack end approach judging section 110 is inputted into the switching sections 121 and 122, and respective contact points a1 and a2 of the switching sections 121 and 122 are respectively switched to the contact points b1 and b2 and the rack axial forces $u_1$ and $u_2$ from the switching sections 121 and 122 are added at the adding section 123 (Step S26). The rack axial force ff being the added result is converted to the current command value Iref2 at the converting section 102 (Step S26A). The current command value Iref2 is inputted into the adding section 103 and added to the current command value Iref1 (Step S27), and the steering control is executed and then returns to the Step 14.

As well, the control element section 143 (Cd) may be any one configuration of a PID (Proportional-Integral-Differential)-control, a PI-control, a PD-control. The operation of the FIG. 14 is merely different only a part to input the rack axial force f and the rack displacement x and is similar. Although the first example of FIG. 14 and the second example of FIG. 15 perform the control calculations of both the feed-forward control section 130 and the feed-back control section 140, the configuration may be only the feed-forward control section 130 or only the feed-back control section 140.

Next, the example (the third example to the sixth example) of the present invention to perform the noise reducing processing will be described.

Figure 18:
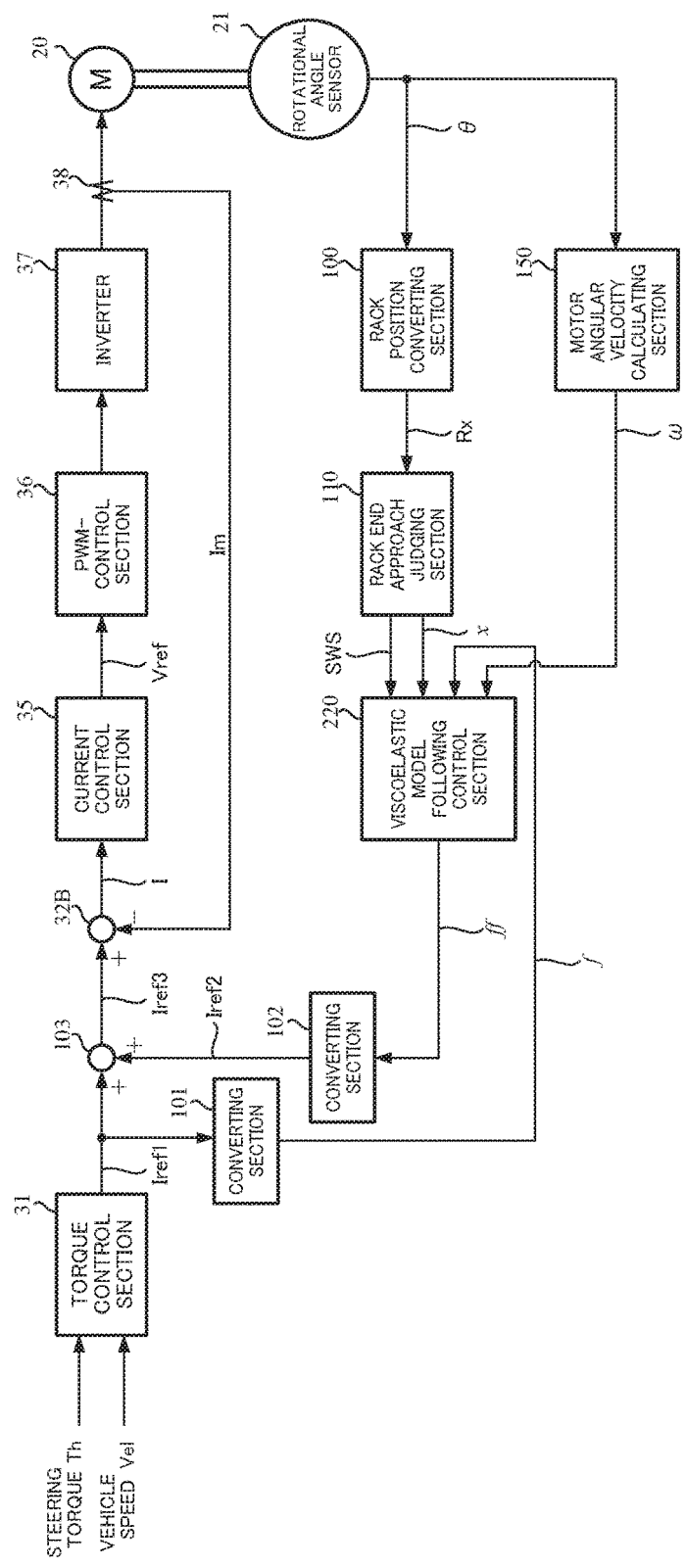
FIG. 18 is a block diagram showing a configuration example (the third example) of the present invention.

FIG. 18 shows the third example of the present invention corresponding to FIG. 3, and a motor angular velocity calculating section 150 is newly added and there is provided a viscoelastic model following control section 220 instead of the viscoelastic model following control section 120. Another configurations are the same and the explanations are omitted.

A rotational angle (a motor angle) θ from the rotational angle sensor 21 is inputted into the motor angular velocity calculating section 150 other than the rack position converting section 100, and is converted to a motor angular velocity ω at the motor angular velocity calculating section 150. The motor angular velocity ω is inputted into the viscoelastic model following control section 220 with the switching signal SWS, the rack displacement x and the rack axial force f.

Figure 19:
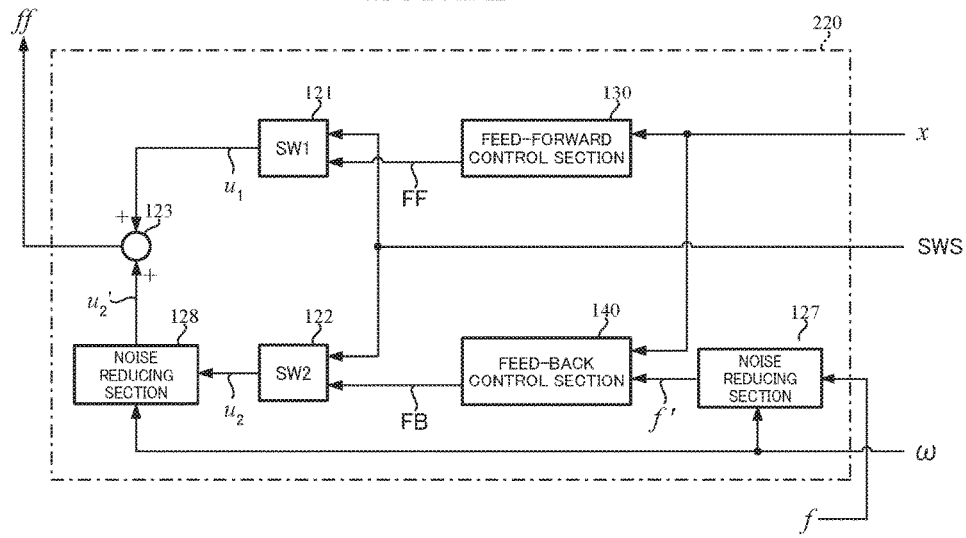
FIG. 19 is a block diagram showing a detailed configuration example (the third example) of the viscoelastic model following control section.

The configuration example of the viscoelastic model following control section 220 is shown in FIG. 19 Corresponding to FIG. 6.

A noise reducing sections 127 and 128 are newly added to the viscoelastic model following control section 220, and the motor angular velocity ω inputted into the viscoelastic model following control section 220 is inputted into the noise reducing sections 127 and 128. The noise reducing section 127 inputs the rack axial force f with the motor angular velocity ω, and the noise reducing section 127 outputs the noise-reduced rack axial force f' to the feed-back control section 140. The noise reducing section 128 inputs the rack axial force $u_2$ outputted from the switching section 122 with the motor angular velocity ω, and the noise reducing section 128 outputs the noise-reduced rack axial force $u_2$' to the adding section 123.

Figure 20:
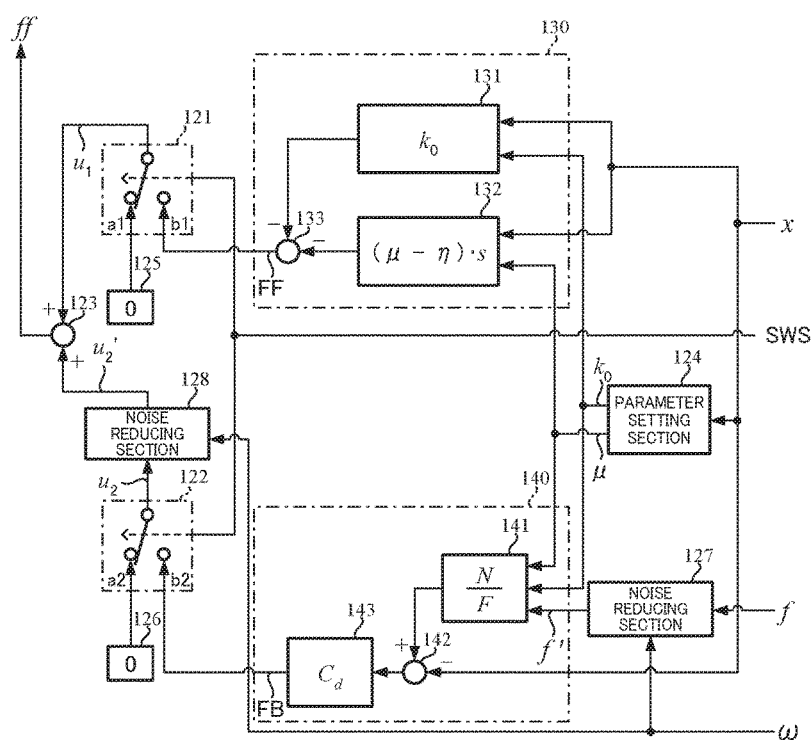
FIG. 20 is a block diagram showing a detailed configuration example (the third example) of the viscoelastic model following control section.

The more detailed configuration example of the viscoelastic model following control section 220 is shown in FIG. 20 Corresponding to FIG. 15.

Similarly to the configuration shown in FIG. 19, the configuration example of FIG. 15 is different that the noise reducing sections 127 and 128 are newly added, and the rack axial force f' is inputted into the feed-back element (N/F) 141 in the feed-back control section 140.

Figure 21:
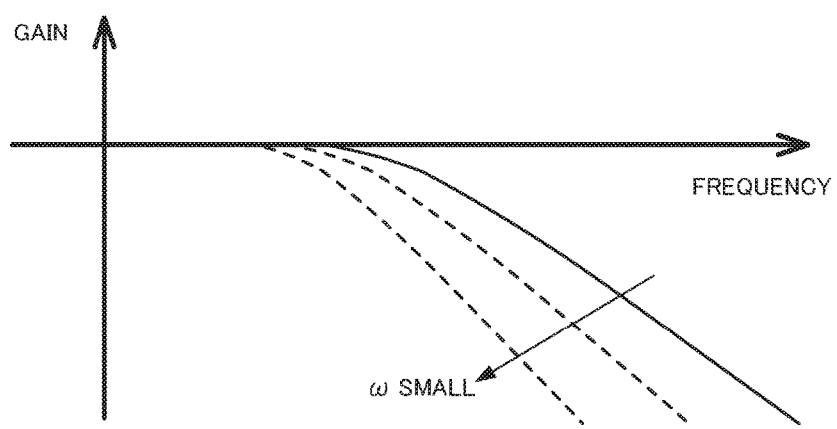
FIG. 21 is a characteristic diagram showing a frequency characteristic example (amplitude characteristic) of a noise reducing section.

The noise reducing section 127 comprises a low pass filter (LPF) and has a frequency characteristic (an amplitude characteristic), for example, such as shown in FIG. 21. That is, the noise reducing section 127 reduces the high frequency components by a primary transfer function H(s) expressed in the below Equation 33.

$$H(s) = K \frac{1}{1+s \cdot Tc} \quad \text{[Equation 33]}$$

where, K is a gain and Tc is a time constant.

The characteristic of the noise reducing section 127 is that: the smaller the motor angular velocity ω is, the smaller a cut-off frequency is as shown by dotted lines of FIG. 21. Further, the gain K and the time constant Tc are set based on the motor angular velocity ω so that the characteristic changes with almost constant rate for the change of the motor angular velocity ω. The noise reducing section 127 reduces the high frequency components of the rack axial force f in accordance with the Equation 33 and outputs the rack axial force f'.

The noise reducing section 128 has a same structure and a operation as the noise reducing section 127, reduces the high frequency components of the rack axial force $u_2$, and outputs the rack axial force $u_2$'.

In the above structure, an overall operation example and an operation example of the viscoelastic model following control are described with reference to flowcharts of FIG. 22 and FIG. 23.

Figure 7:
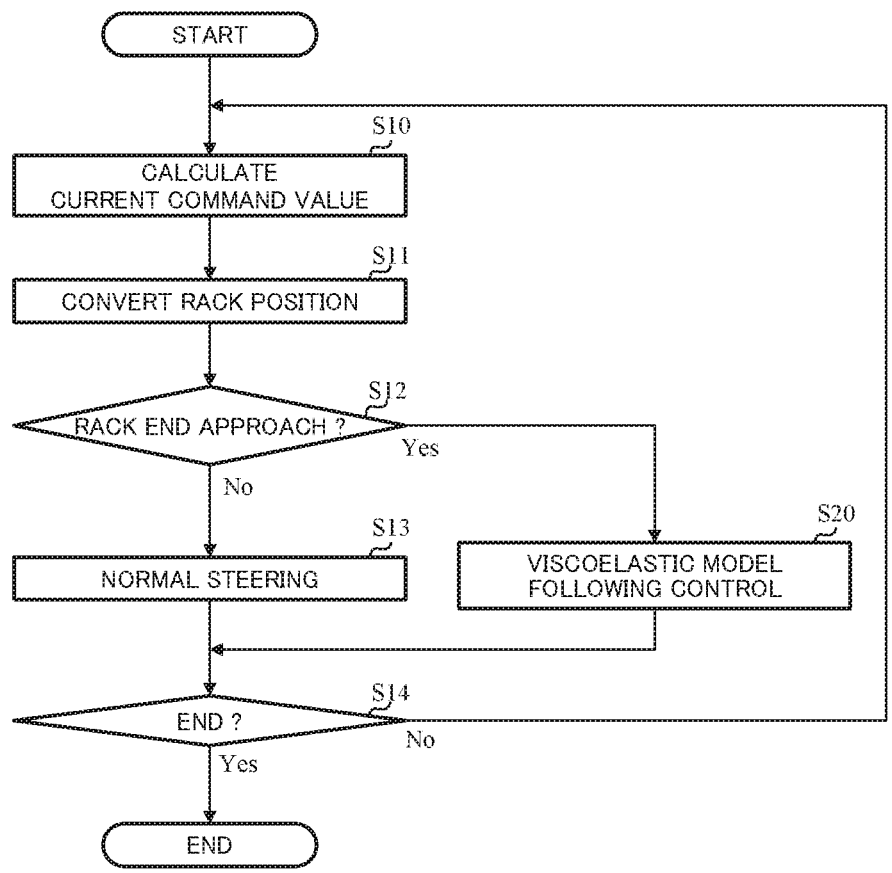
FIG. 7 is a flowchart showing an operation example (overall) of the present invention.
Figure 22:
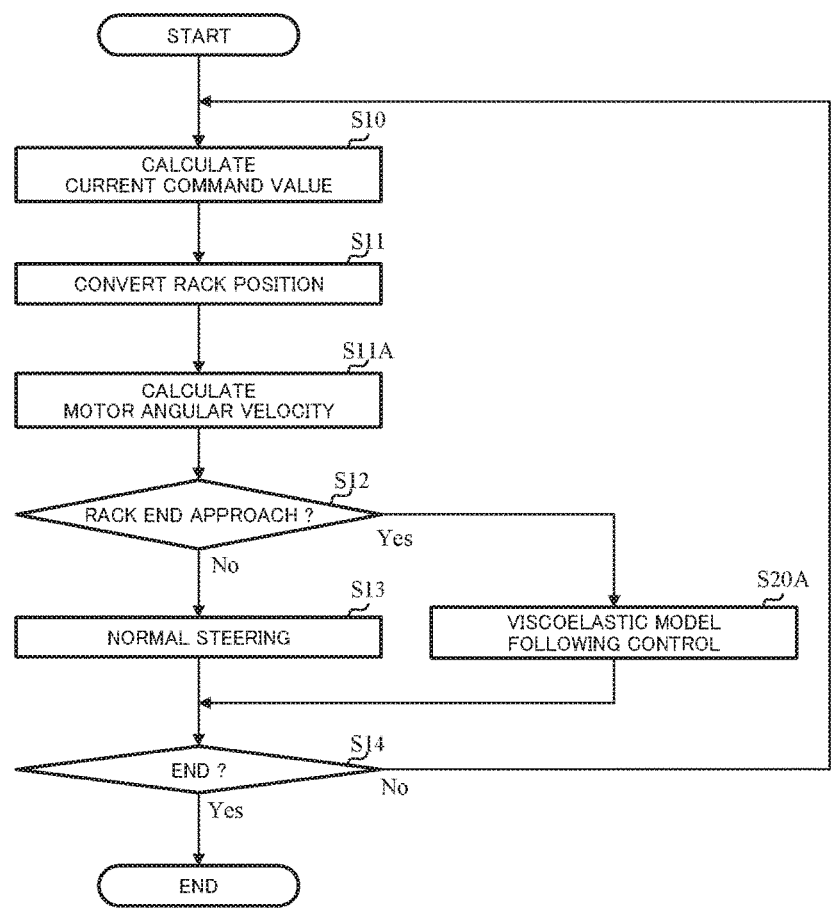
FIG. 22 is a flowchart showing an operation example (overall) (the third example) of the present invention.

FIG. 22 shows the overall operation example, and a Step S11A is newly added and the operation of the viscoelastic model following control is change as under-mentioned (Step S20A) in comparison with the flowchart of FIG. 7.

At the Step S11A, the motor angular velocity calculating section 150 calculates the motor angular velocity ω based on the rotational angle θ from the rotational angle sensor 21.

Figure 23:
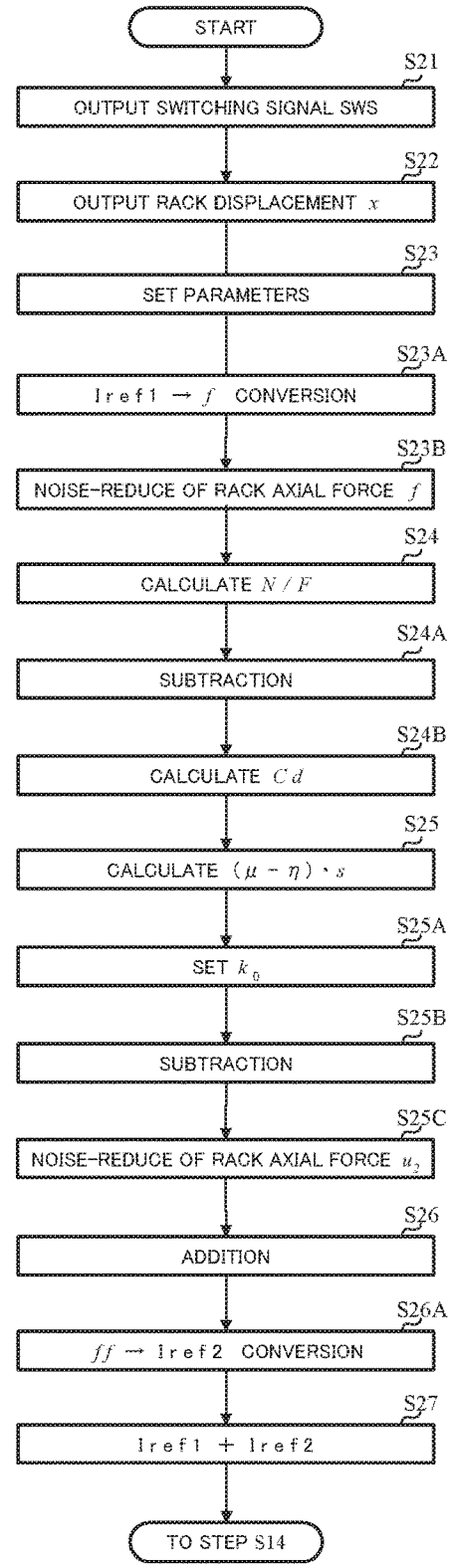
FIG. 23 is a flowchart showing an operation example (the third example) of the viscoelastic model following control section.

The operation of the viscoelastic model following control is shown with the flowchart of FIG. 23.

Figure 17:
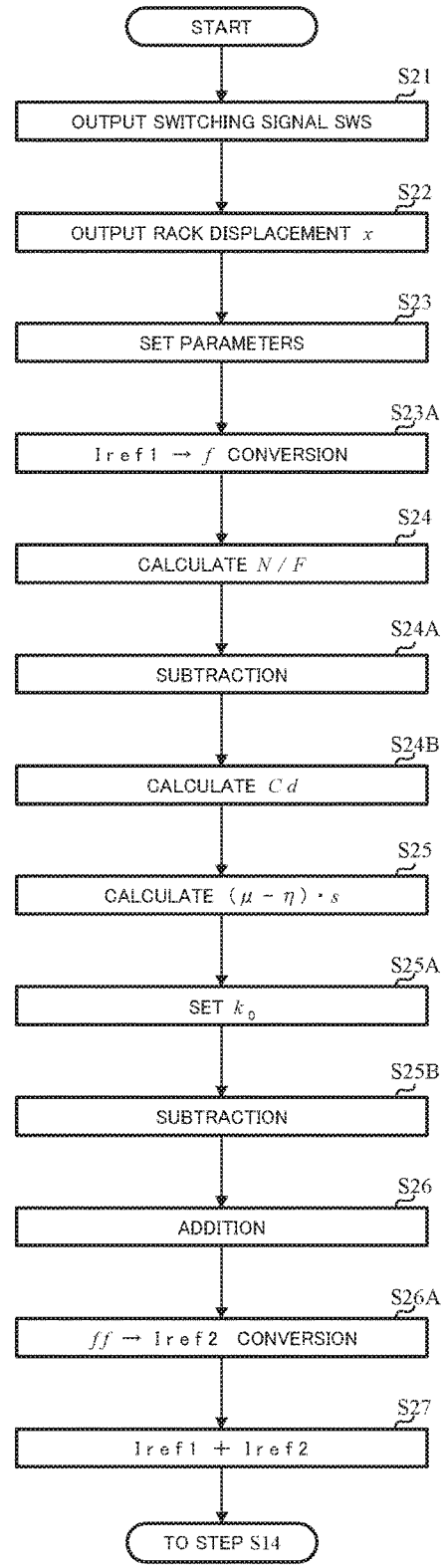
FIG. 17 is a flowchart showing an operation example (the second example) of the viscoelastic model following control section.

In the viscoelastic model following control, first, similarly to the operation of the second example shown in FIG. 17, the switching signal SWS from the rack end approach judging section 110 and the rack displacement x are outputted (Step S21, Step S22), and the rack displacement x is inputted into the spring constant term 131, the viscous friction coefficient term 132, the parameter setting section 124 and the subtracting section 142. The parameter setting section 124 sets the spring constant $k_0$ and the viscous friction coefficient μ in the spring constant term 131, the viscous friction coefficient term 132 and the feed-back element (N/F) 141 (Step S23), and the converting section 101 converts the current command value Iref1 to the rack axial force f (Step S23A). The rack axial force f is inputted into the noise reducing section 127 with the motor angular velocity ω, the noise reducing section 127 reduce a noise of the rack axial force f based on the transfer function of the Equation 33 (Step S23B). Then, the noise-reduced rack axial force f' is inputted into the feed-back element (N/F) 141 and then is N/F-calculated (Step S24). Thereafter, the same operations at the Steps S24A and S24B of the second example are performed in the feed-back control section 140, and the rack axial force FB is inputted into the contact point b2 of the switching section 122.

In the feed-forward control section 130, the same operations at the Steps S25 to S25B of the second example are performed, and the rack axial force FF is inputted into the contact point b1 of the switching section 121.

The switching signal SWS from the rack end approach judging section 110 is inputted into the switching sections 121 and 122, and respective contact points a1 and a2 of the switching sections 121 and 122 are respectively switched to the contact points b1 and b2. The rack axial force $u_1$ from the switching section 121 is inputted into the adding section 123, and the rack axial force $u_2$ from the switching section 122 is inputted into the noise reducing section 128. The rack axial force $u_2$ is noise-reduced at the noise reducing section 128 (Step S25C), and is outputted as the rack axial force $u_2'$ and is added with the rack axial force $u_1$ (Step S26). Then, the rack axial force ff as the added result is converted to the current command value Iref2 at the converting section 102 (Step S26A). The current command value Iref2 is inputted into the adding section 103 and added to the current command value Iref1 (Step S27), and the steering control is executed and then the operation returns to the Step 14.

As well, for the first embodiment shown in FIG. 5 and the first example shown in FIG. 14, it is possible to perform the same aspects similar to FIG. 19 and FIG. 20, i.e. to provide the noise reducing sections at a front stage of an input of the rack axial force f to the feed-back control section 140 and at a rear stage of an output of the rack axial force $u_2$ from the switching section 122. The operations in this case are the same except for the portion (element) to input the rack axial force f and the rack displacement x.

The fourth example will be described.

Although the noise reducing sections are provided at the front stage of the input of the rack axial force to the feed-back control section 140 and at the rear stage of the output from the switching section 122 in the third example, there are provided the noise reducing sections at the rear stage of input of the rack displacement to the feed-back control section 140 instead of the rear stage of the output of the switching section 122 in the fourth example. The change of the motor angle is inputted into the subtracting section to obtain a deviation with the feed-back element (N/F) as a change of the rack displacement, and the deviation is inputted into the control element section (Cd). Accordingly, although the noise reducing sections are provided at final stage of the signal-flow in the third example, since the change of the motor angle appears as an output of the control element section (Cd), the noise reducing sections are provided at the front stage of the signal-flow in the fourth example.

Figure 24:
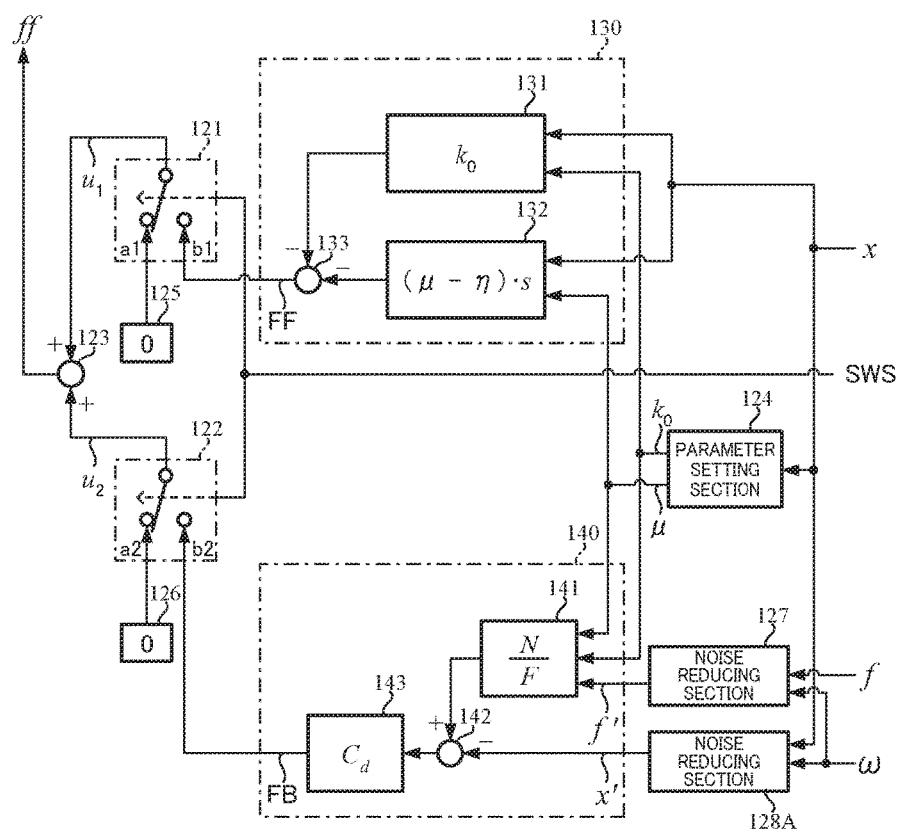
FIG. 24 is a block diagram showing a detailed configuration example (the fourth example) of the viscoelastic model following control section.

FIG. 24 shows a detailed configuration example of the viscoelastic model following control in the fourth example, a noise reducing section 128A is provided, not at the rear stage of the switching section 122, at front stage of input to the calculating section 142 in comparison with the configuration of the third example shown in FIG. 20. The noise reducing section 128A has the same configuration and operation with the noise reducing section 128, reduces the high frequency components of the rack displacement x, outputs the rack displacement x' and the rack displacement x' is subtracting-inputted into the subtracting section 142.

Although the overall operation of the fourth example is similar to the operation of the third example shown in FIG. 22, there are differences due to the provided positions of the noise reducing section in the operations of the viscoelastic model following control.

Figure 25:
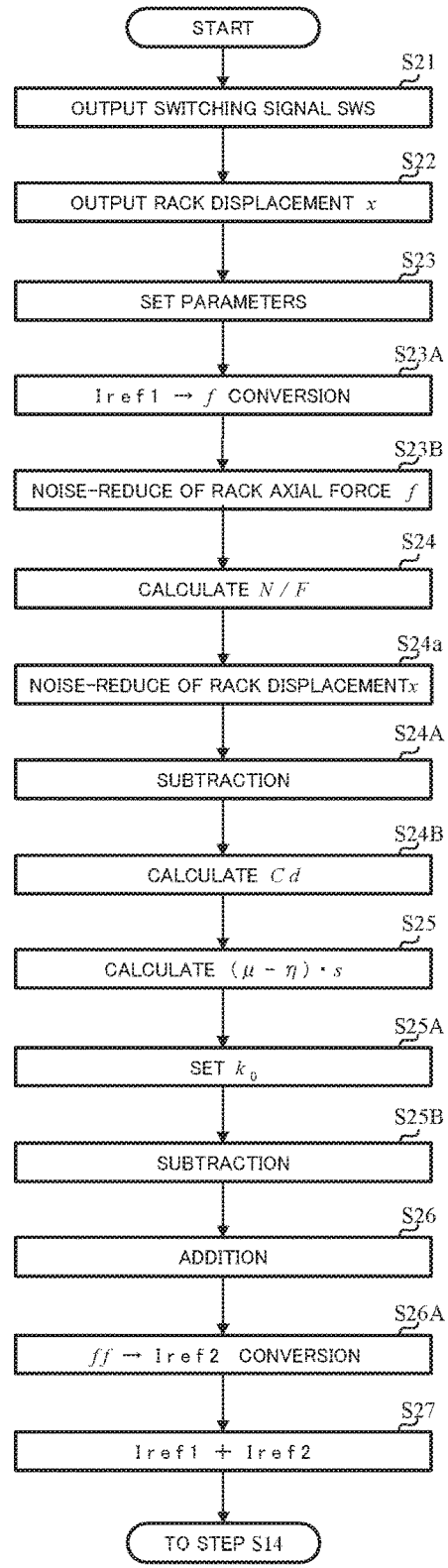
FIG. 25 is a flowchart showing an operation example (the fourth example) of the viscoelastic model following control section.

An operation example of the viscoelastic model following control in the fourth example is shown in FIG. 25. In the viscoelastic model following control, the same Steps S21 and S22 with the third example are executed, the rack displacement x is inputted into the parameter setting section 124, the noise reducing section 128A and the feed-forward control section 130. The parameter setting section 124 executes the same Step S23 with the third example. Thereafter, the same Steps S23A to S24 with the third example are executed. The noise reducing section inputs the rack displacement x and the motor angular velocity ω and reduces the noise included in the rack displacement x (Step S24a). The noise-reduced rack displacement x' is subtracting-inputted into the subtracting section 142, and the rack displacement x' is subtracted from the N/F-calculated value being adding-inputted (Step S24A). The subtracted value is CD-calculated at the control element section 143 (Step S24B), and a rack axial force FB from the control element section 143 is inputted into the contact point b2 of the switching section 122.

The same operations at the Steps S25 to S25B with the third example are executed in the feed-forward control section 130, and the rack axial force FF is inputted into the contact point b1 of the switching section 121.

Thereafter, the same operations at the Steps S26 to S27 with the second example shown in FIG. 17 are executed, and the process returns to the Step S14.

Besides, similarly to the third example, it is possible to provide the noise reducing section with the same aspect of FIG. 24 for the first example shown in FIG. 14.

The fifth example will be described.

In the fifth example, the noise reducing section is provided in the feed-back control section 140, concretely at the rear stage of the output of the subtracting section 142 instead of the rear stage of the output from the switching section 122 in the third example.

Figure 26:
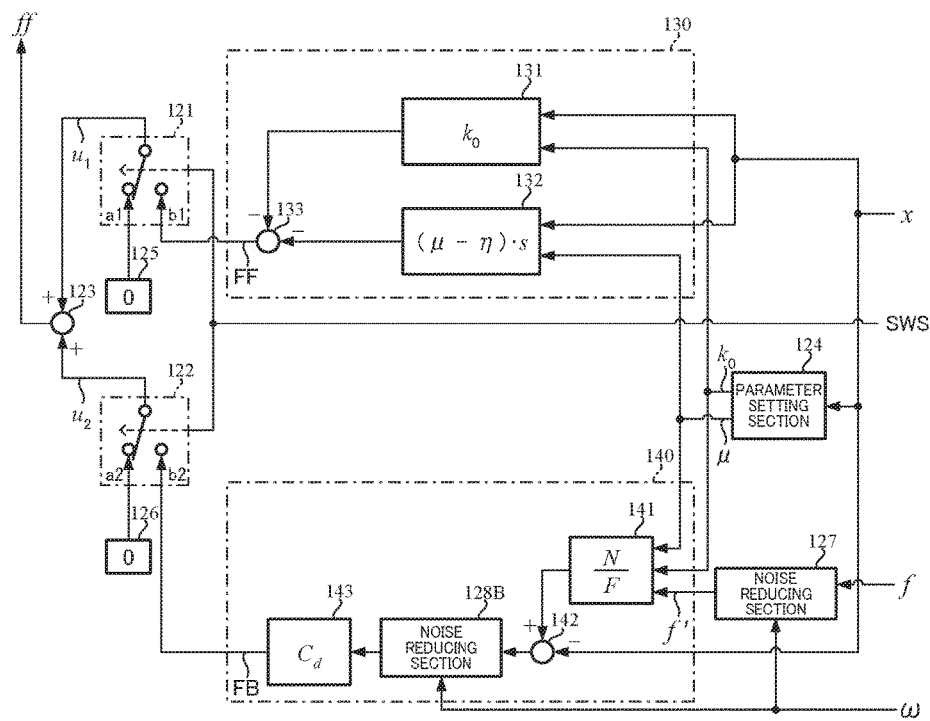
FIG. 26 is a block diagram showing a detailed configuration example (the fifth example) of the viscoelastic model following control section.

FIG. 26 shows a detailed configuration of the viscoelastic model following control in the fifth example, a noise reducing section 128B is provided at the rear stage of an output from the subtracting section 142, not at the rear stage of switching section 122, in comparison with the configuration of the viscoelastic model following control in the third example shown in FIG. 20. The noise reducing section 128B has the same configuration and operation with the noise reducing section 127, and reduces the high frequency components of an output from the subtracting section 142 and outputs to the control element section 143.

Although the overall operations of the fifth example is also similar to the same with the third example, there is a difference due to the providing position of the noise reducing section in the operation of the viscoelastic model following control.

Figure 27:
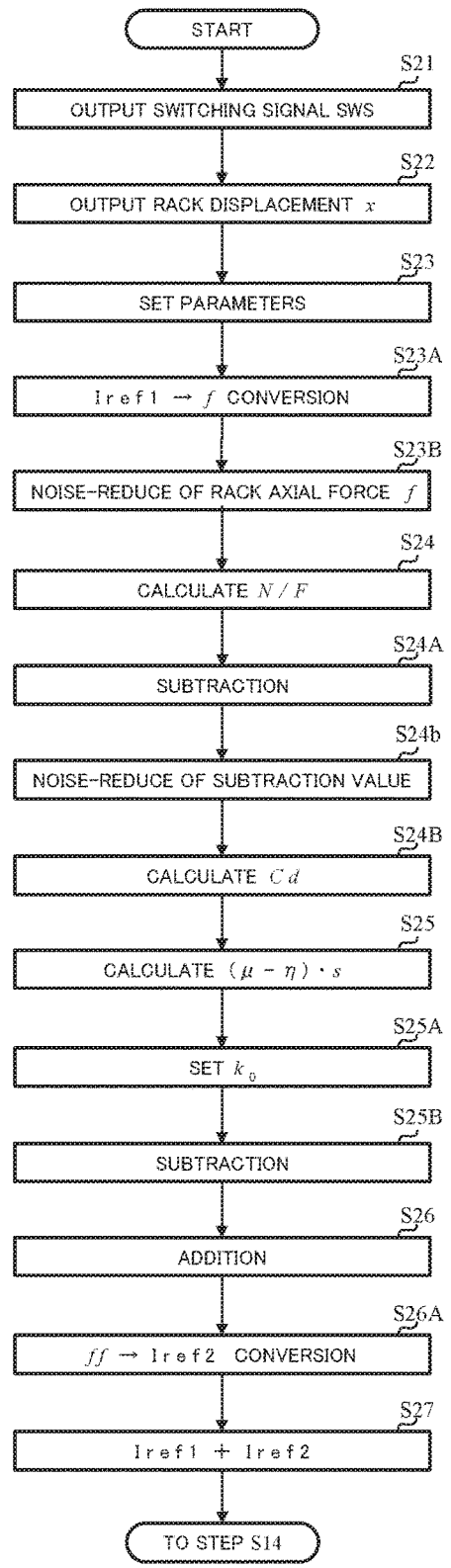
FIG. 27 is a flowchart showing an operation example (the fifth example) of the viscoelastic model following control section.

The operation example of the viscoelastic model following control in the fifth example is shown in FIG. 27. In the viscoelastic model following control, the same operations with the third example are executed till the Step S24A. The N/F-calculated value which is subtracted the rack displacement x at the subtracting section 142 is inputted into the noise reducing section 128B and the noise is reduced (Step S24b), and then is Cd-calculated at the control element section 143 (Step S24B). Thereafter, the same operations at the Steps S25 to S27 with the second example shown in FIG. 17 are executed, and the process returns to the Step S14.

Besides, similarly to the third example, it is possible to provide the noise reducing section with the same aspect of FIG. 26 for the first example shown in FIG. 14.

The sixth example will be described.

Although the characteristic of the noise reducing section is changed corresponding to the motor angular velocity in the third example, it is changed corresponding to the rack displacement velocity in the sixth example. Since the rack displacement velocity similarly changes with the motor angular velocity, the rack displacement velocity is capable of using as the parameters to change the characteristic of the noise reducing section. It is possible to select the parameters corresponding to a configuration of the apparatus, a using state and so on by increasing the choices of the parameters.

Figure 28:
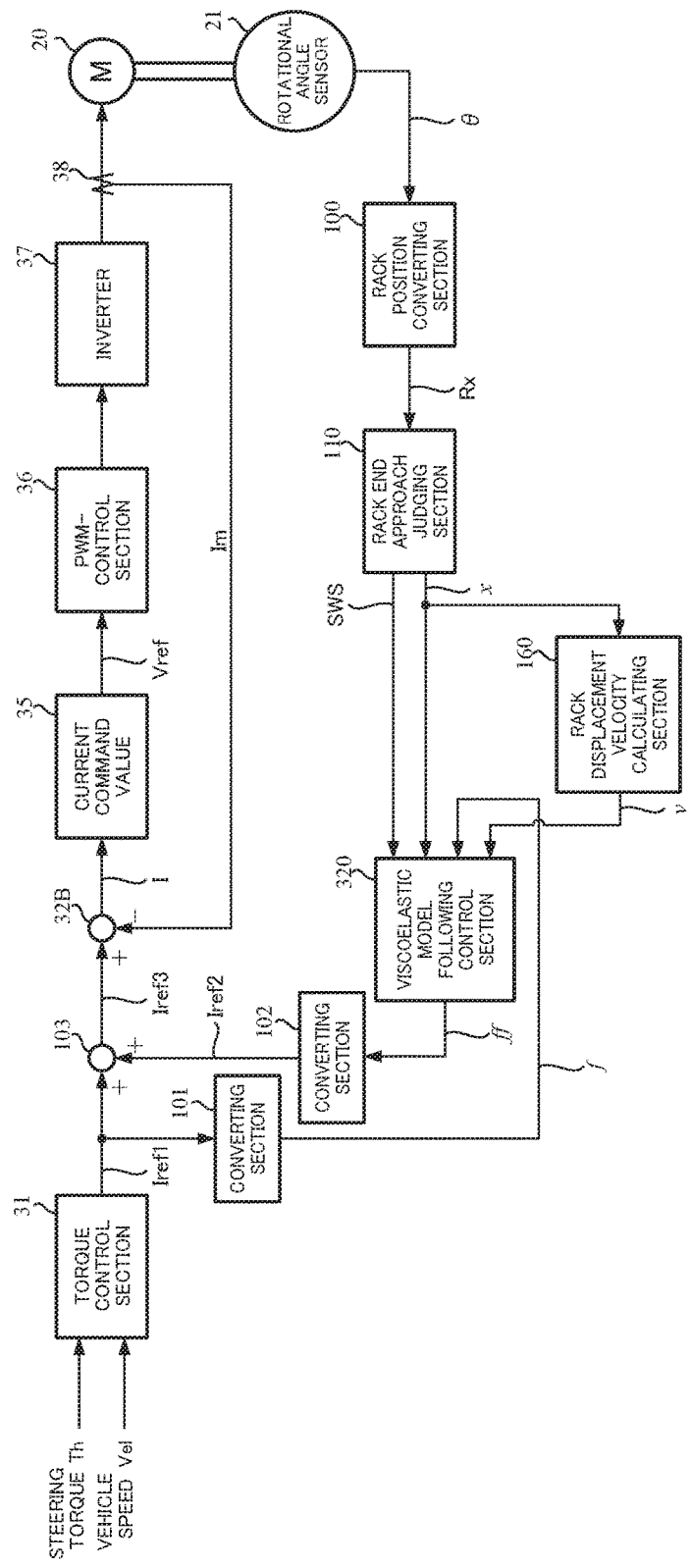
FIG. 28 is a block diagram showing a configuration example (the sixth example) of the present invention.
Figure 29:
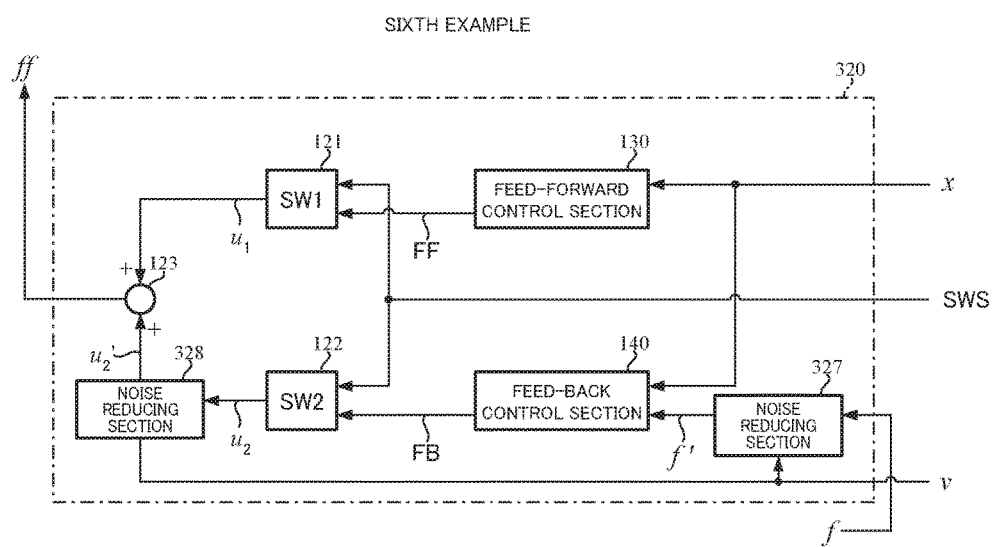
FIG. 29 is a block diagram showing a configuration example (the sixth example) of the viscoelastic model following control section.

The configuration example of the sixth example is shown in FIG. 28, and the configuration example of the viscoelastic model following control therein is shown in FIG. 29. In comparison with the third example shown in FIG. 18, the rack displacement velocity calculating section 160 is provided in place of the motor angular velocity calculating section 150 in the sixth example. The rack displacement velocity calculating section 160 calculates the rack displacement velocity v based on the rack displacement x outputted from the rack end approach judging section 110 and outputs v to the viscoelastic model following control section 320. In the viscoelastic model following control section 320, the rack displacement velocity v is inputted into the noise reducing sections 327 and 328 as shown in FIG. 29. The noise reducing sections 327 and 328 respectively comprise, for example, a primary LPF having the same frequency characteristics (amplitude characteristics) as shown in FIG. 21, and the gain k and the time constant Tc are set so that the characteristics change in accordance with the rack displacement velocity v, not the motor angular velocity ω.

The operation of the sixth example is the same with the third example except that the rack displacement velocity calculating section 160 calculates the rack displacement velocity v and the noise reducing section uses the rack displacement velocity v for substituting that the motor angular velocity calculating section 150 calculates the motor angular velocity ω and the noise reducing section uses the motor angular velocity ω.

Besides, similarly to the third example, it is possible to provide the noise reducing section with the same aspect of FIG. 29 for the first embodiment shown in FIG. 5.

Although the characteristic of the noise reducing section is expressed by the primary transfer function in the above third to sixth examples, it may be secondary or more or another type transfer function if the transfer function of the LPF is.

Further, although the respective examples include two the noise reducing sections, it may be one or three or more. The position or number of the noise reducing section may be arbitrarily determined in accordance with a factor or a size of the vibration occurring.

Furthermore, the control calculations of both the feed-forward control section and the feed-back control section are performed in the third example to the sixth example, it may be a configuration of only the feed-back control section.

Next, the examples (the seventh to ninth examples) of the present invention to perform the change-amount limiting processing will be described.

Figure 30:
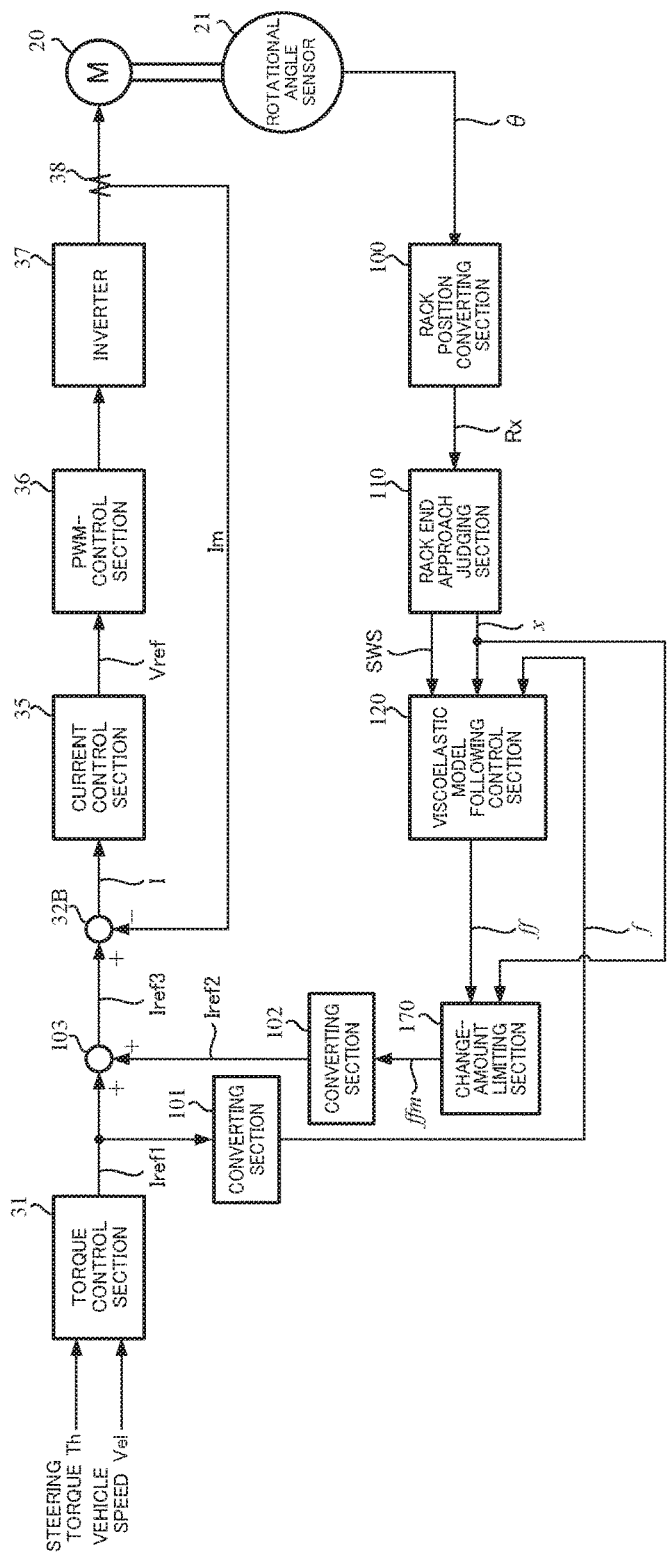
FIG. 30 is a block diagram showing a configuration example (the seventh example) of the present invention.

FIG. 30 shows the seventh example of the present invention corresponding to FIG. 3, a change-amount limiting section 170 is newly added in comparison with the embodiment shown in FIG. 3. The rack displacement x outputted from the rack end approach judging section 110 and the rack axial force ff outputted from the viscoelastic model following control section 120 are inputted into the change-amount limiting section 170, and the rack axial force ffm outputted from the change-amount limiting section 170 is inputted into the converting section 102.

The change-amount limiting section 170 changes the rack axial force ff(t) based on the following Equation 34 and outputs the rack axial force ffm when an absolute value |Δffm(t)|(change amount) of a difference "Δffm(t)=ff(t)−ffm(t−T)" between a rack axial force ff(t) at a time t and a rack axial force ffm(t−T) at a time "t−T" T prior to time t (former 1-sampling time, and T is a sampling time) is larger than a predetermined value THf.

$$ffm(t)=ffm(t-T)+THf\times sign(ff(t)-ffm(t-T))$$ [Equation 34]

where, sign(X) is a sign function and a sign (−1, 0, 1) of a real number X is returned.

The rack axial force is, as it is, outputted as the rack axial force ff (t) when the change amount is equal to or less than the predetermined value THf. Since the rack axial force ff(t) is used in the change-amount calculation at a next time, it is stored in the change-amount limiting section 170.

Figure 31:
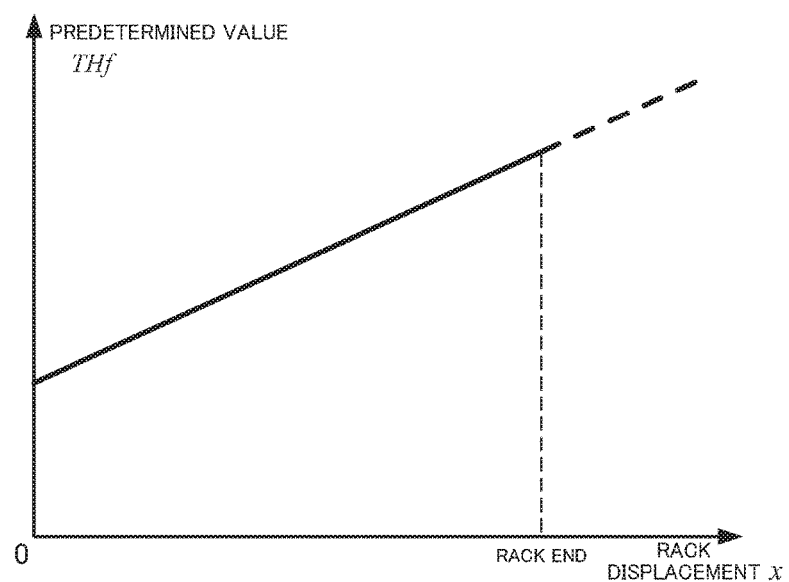
FIG. 31 is a diagram showing a characteristic example of a predetermined value corresponding to the rack displacement.

As the predetermined value THf, a proportional value for the rack displacement x as shown in FIG. 31 is used. That is, the change-amount limiting section 170 determines the predetermined value THf due to the inputted rack displacement x, limits the rack axial force ff with the determined predetermined value THf and outputs as the rack axial force ffm. In FIG. 31, a region actually used as the predetermined value THf is a scope corresponding to a predetermined angle at front of the rack end. That is, the region is from a position where the rack displacement x is zero to a position corresponding to the rack end.

In the above structure, an operation example of the present example will be described with reference to flow-charts of FIG. 32 and FIG. 33.

Figure 32:
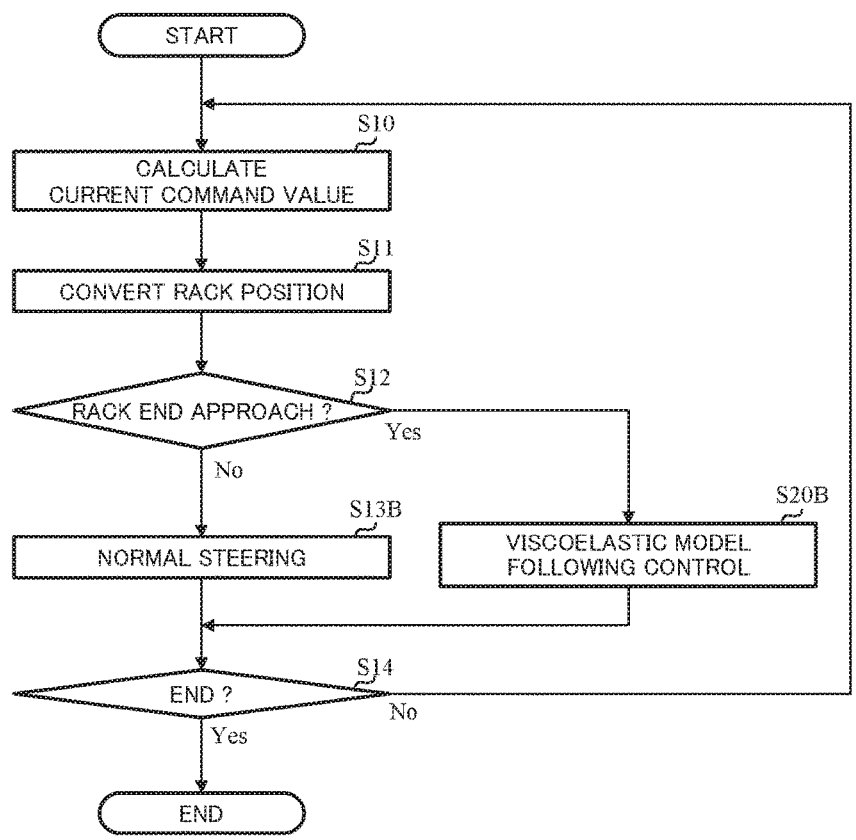
FIG. 32 is a flowchart showing an operation example (overall) (the seventh example) of the present invention.

FIG. 32 shows an overall operation example, and the process is changed in comparison with the flowchart of FIG. 7 (Steps S13B and S20B), since the process at the change-amount limiting section 170 is added to the normal steering (Step S13) and the viscoelastic model following control (Step S20).

In the normal steering (Step S13B), first, the rack displacement x is outputted from the rack end approach judging section 110, and the rack axial force ff of which value is zero is outputted from the viscoelastic model following control section 120. The change-amount limiting section 170 inputs the rack displacement x and the rack axial force ff, and determines the predetermined value THf based on the rack displacement x in accordance with FIG. 31. Then, the change-amount limiting section 170 calculates the rack axial force ffm by comparing the change amount of the value (=0) of the rack axial force ff and the value of the rack axial force ffm at the time t−T and the predetermined value THf and outputs the calculated value. The rack axial force ffm is converted to the current command value Iref2 at the converting section 102, and is added to the current command value Iref1 at the adding section 103. The rack axial force ffm at the time t−T is likely to be a value except for zero just after changed from the viscoelastic model following control to the normal steering. As a result, although the current command value Iref2 is likely to be a value except for zero, the rack axial force ffm approaches zero with the passage of time. Then, since the current command value Iref2 also becomes zero, the steering control is performed based on the current command value Iref1.

Figure 8:
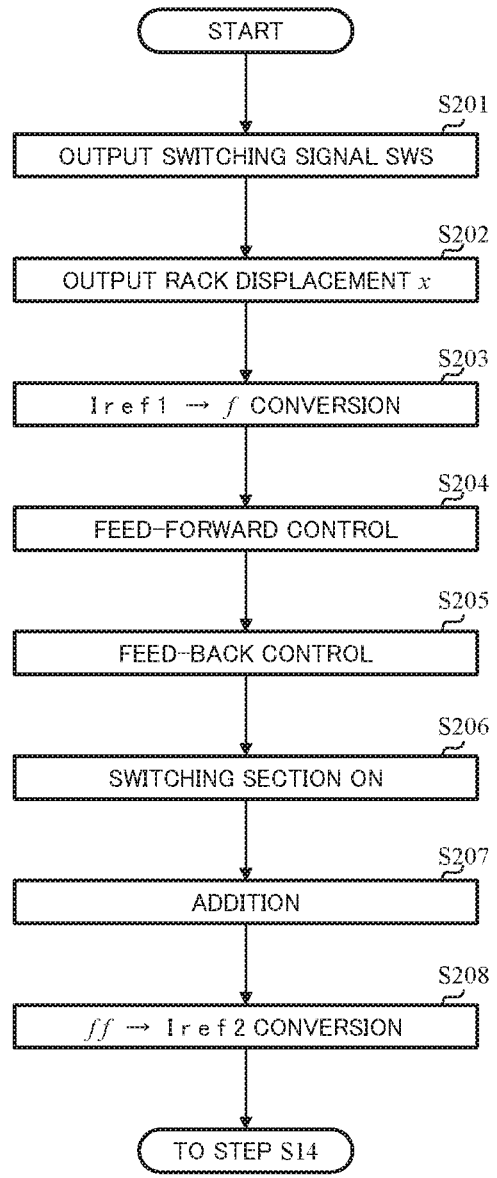
FIG. 8 is a flowchart showing an operation example of the viscoelastic model following control section.
Figure 33:
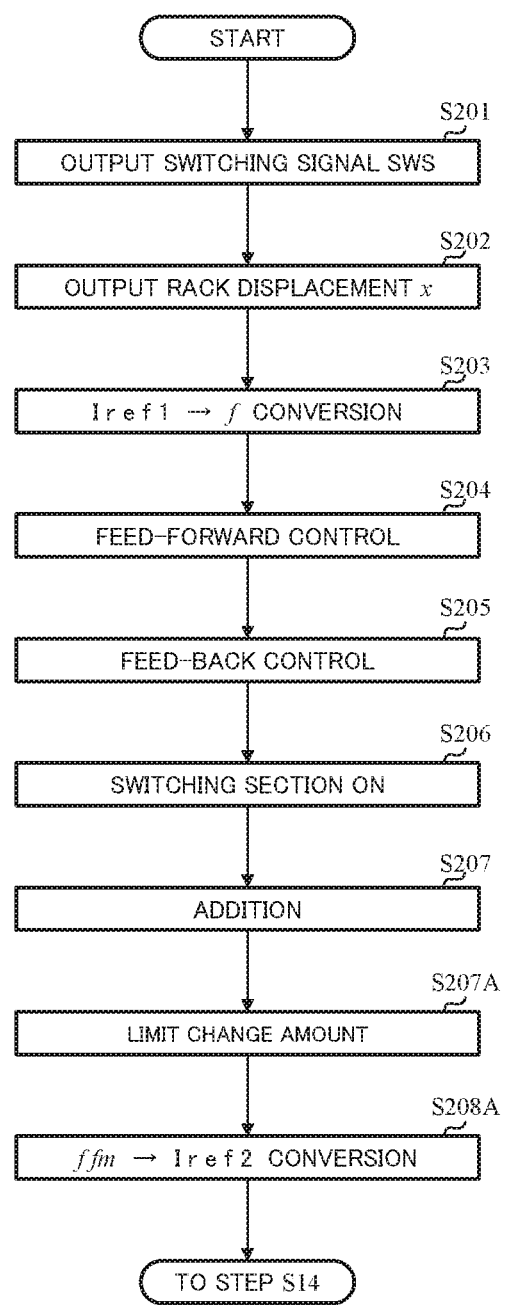
FIG. 33 is a flowchart showing an operation example (the seventh example) of the viscoelastic model following control section.

The operation of the viscoelastic model following control (Step S20B) is shown in a flowchart of FIG. 33, and the Step 207A is added in comparison with the flowchart of FIG. 8. At the Step 207A, the same operation with the change-amount limiting section 170 in the normal steering is executed. That is, the change-amount limiting section 170 determines the predetermined value THf corresponding to the rack displacement x in accordance with FIG. 31, and calculates the rack axial force ffm by comparing the change amount of the value of the rack axial force ff and the value of the rack axial force ffm at the time t−T and the predetermined value THf and outputs the calculated value. The rack axial force ffm is converted to the current command value Iref2 at the converting section 102 (Step S208A), and is added to the current command value Iref1 at the adding section 103

The eighth example will be described.

In the seventh example, although the predetermined value used in the change-amount limiting section is changed based on the rack displacement, it is changed based on the rotational angle of the motor in the eighth example. Since the rack position and the rotational angle are linking so that the rotational angle θ is converted to the judging rack position Rx at the rack position converting section 100, it is possible to get the same effects with the seventh example even if the predetermined value is changed based on the rotational angle.

Figure 34:
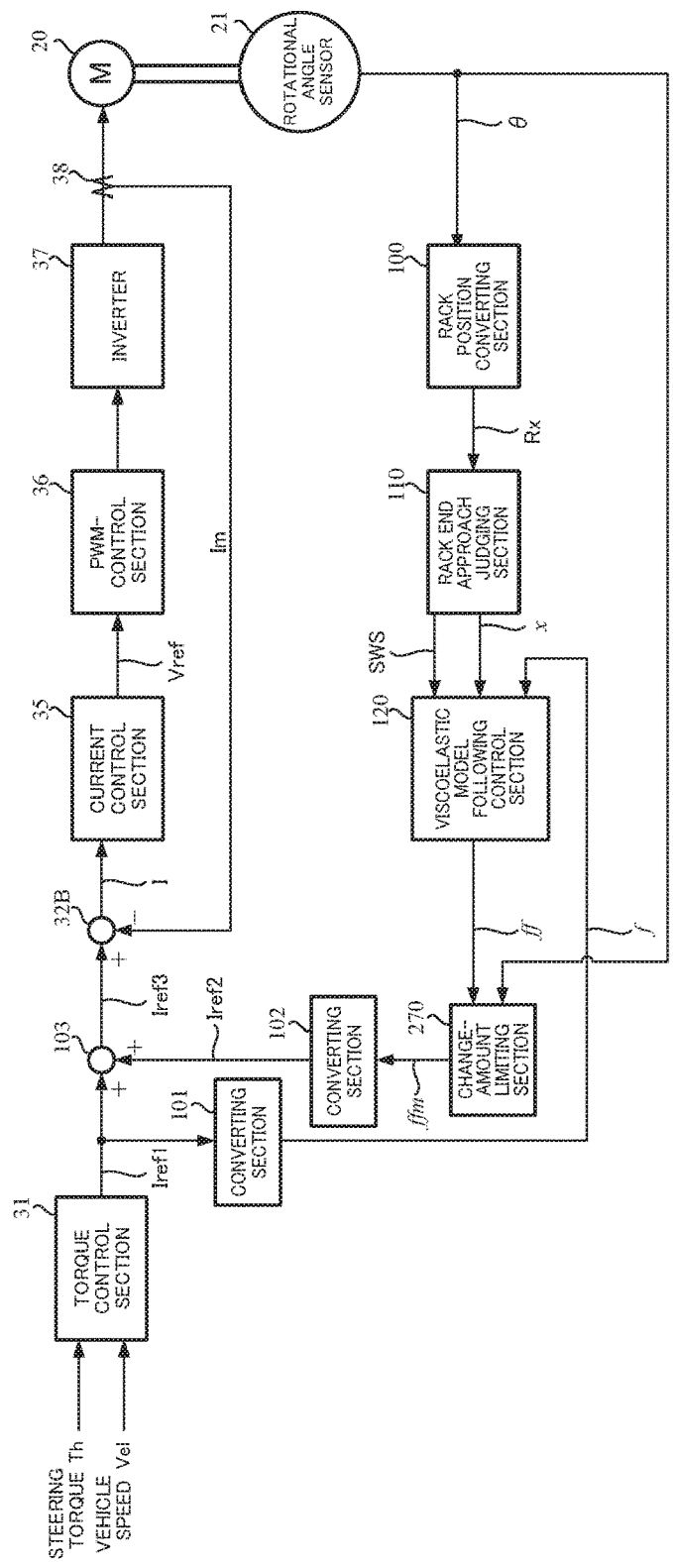
FIG. 34 is a block diagram showing a configuration example (the eighth example) of the present invention.

FIG. 34 shows the eighth example, and the change-amount limiting section inputs the rotational angle θ instead of the rack displacement x in comparison with the seventh example shown in FIG. 30.

Figure 35:
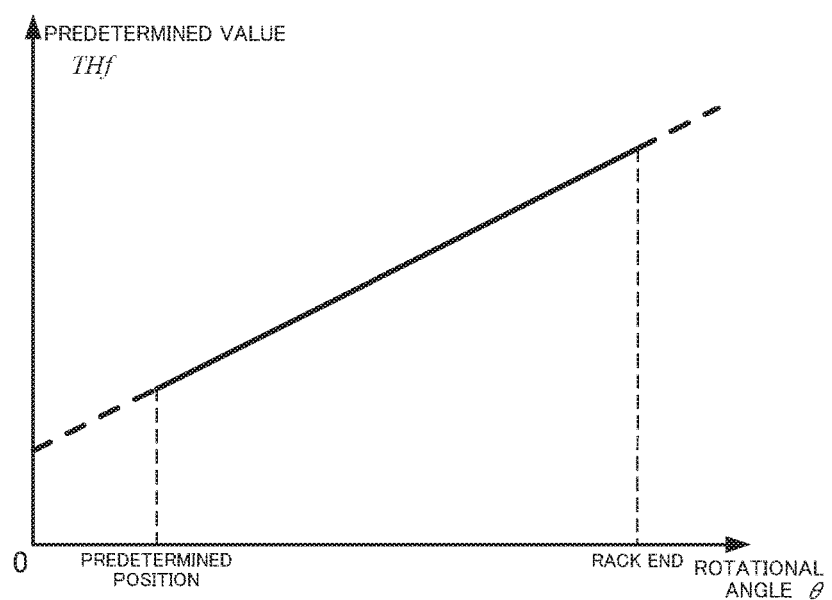
FIG. 35 is a diagram showing a characteristic example of a predetermined value corresponding to the rotational angle.

Although the change-amount limiting section 270 calculates the rack axial force ffm by comparing the change amount of the rack axial force ff(t) at a time t and the rack axial force ffm(t−T) at the time "t−T" T prior to the time t and the predetermined value THf similar to the seventh example, a proportional value for the rotational angle θ is used as the predetermined value THf as shown in FIG. 35. That is, the change-amount limiting section 270 decides the predetermined value THf based on the rotational angle θ, limits the rack axial force ff with the decided-predetermined value THf, and outputs the limited rack axial force as the rack axial force ffm. In FIG. 35, a region actually used as the predetermined value THf is between a rotational angle corresponding to a predetermined position at front of the rack end and a rotational angle corresponding to the rack end.

The operation of the eighth example is the same with the seventh example except for that the determination of the predetermined value THf at the change-amount limiting section 270 is performed based on the rotational angle θ outputted from the rotational angle sensor 21.

The change-amount limiting section in the seventh and eighth examples compares the change amount being an absolute value of a difference Δffm(t) between the rack axial force ff (t) at the time t and the rack axial force ffm(t−T) at the time "t−T" T prior to the time t and the predetermined value THf. Therefore, the same predetermined value THf is used if the absolute values are same even if the signs of Δffm(t) are different. However, it is possible to change the predetermined value THf to use based on the sign of Δffm(t). That is, a different predetermined value THf is used when the sign are different even if the absolute values are same. Since the sign of Δffm(t) are usually inverse when the steering enters in the region of the predetermined angle at front of the rack end and goes out therefrom, it is possible to more flexibly adjust by changing the predetermined value THf based on the sign of Δffm(t).

Figure 36:
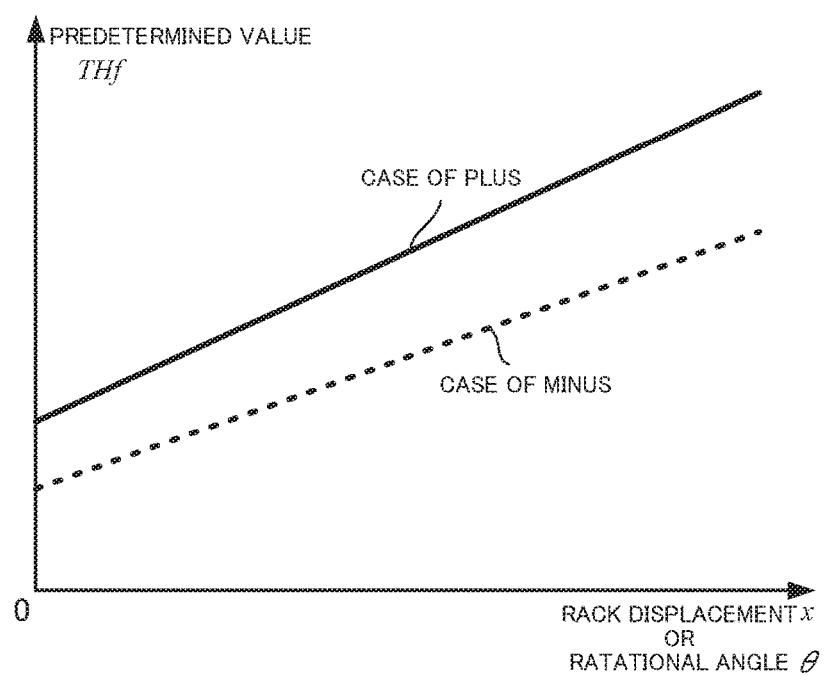
FIG. 36 is a diagram showing a characteristic example of a predetermined value changing due to a sign of the difference of the rack axial forces.

The characteristic example used in the change-amount limiting section in such example is shown in FIG. 36 (the ninth example). As shown in FIG. 36, a characteristic of a real line is used when Δffm(t) is plus, and a characteristic of a dotted line is used when Δffm(t) is minus.

Although the absolute value of the difference Δffm(t) between the rack axial force ff (t) at the time t and the rack axial force ffm(t−T) at the time "t−T" T prior to the time t is used as the change amount in the seventh to the ninth examples, it is possible to use a ratio as the change amount. For example, a ratio of the absolute value of Δffm(t) to the rack axial force ffm(t−T) is used as the change amount, and the predetermined value is set in accordance with the ratio. Further, although the predetermined value is proportional to the steering information (the rack displacement, the rotational angle), it may be a curve or a step function such that the characteristic become large as the steering information increases. Furthermore, the configuration may be adopted that: the switching signal SWS outputted from the rack end approach judging section is also inputted into the change-amount limiting section, the judgment when the steering enters the predetermined angle at front of the rack end and goes out therefrom is performed by ON/OFF of the switching signal SWS, and the change amount is only limited within the predetermined angle at front of the rack end and till a next timing when the steering goes out therefrom. Consequently, it is possible to decrease the processing amount in the normal steering. Further, the change amount may be changed as the ninth example when the steering enters the predetermined angle at front of the rack end and goes out therefrom by performing the above judgment. Thus, it is possible to obtain the same effects with the ninth example.

As well, also in the seventh to ninth examples, the viscoelastic model following control section may be configured by only the feed-back control section or the feed-forward control section.

Next, the examples (the tenth to thirteenth examples) of the present invention to perform the start steering angle changing processing will be described.

Figure 37:
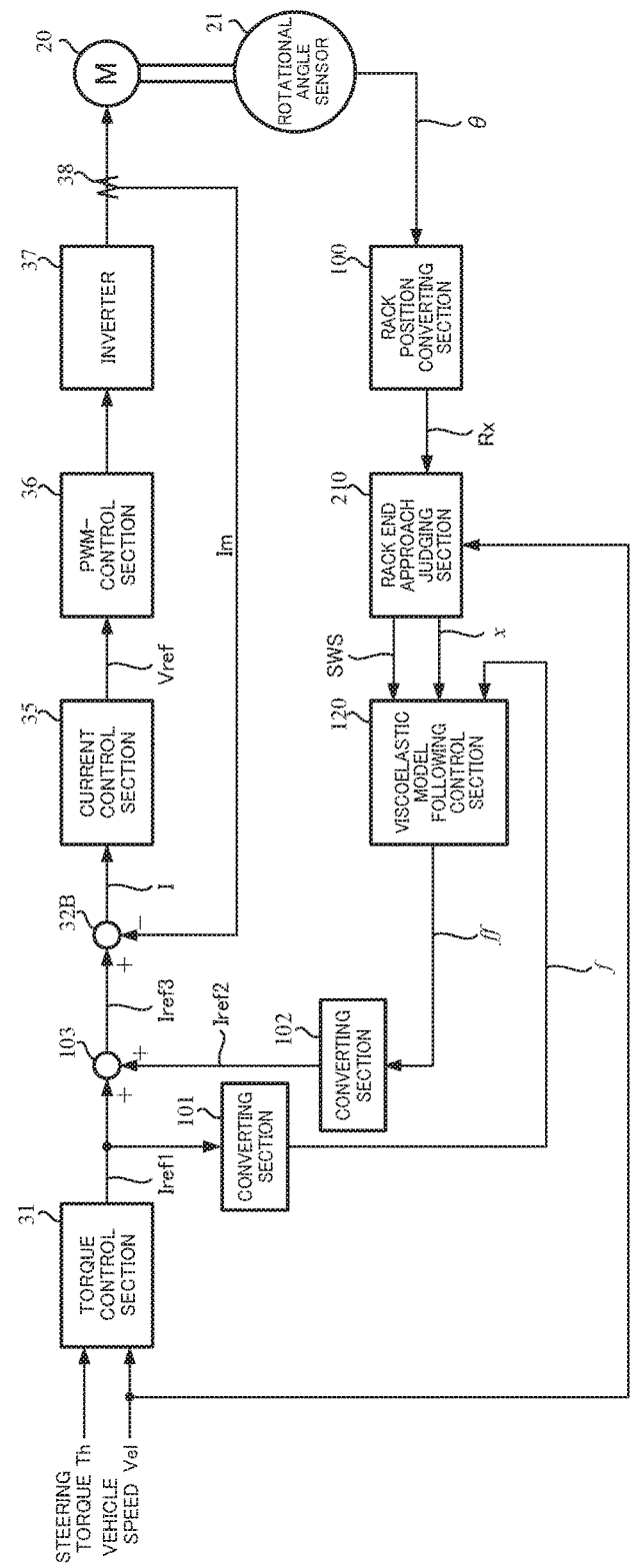
FIG. 37 is a block diagram showing a configuration example (the tenth example) of the present invention.

FIG. 37 shows an example (the tenth example) of the present invention corresponding to FIG. 3, and the rack end approach judging section 110 is alternated to a rack end approach judging section 210 also inputting the vehicle speed Vel in comparison with the embodiment shown in FIG. 3. That is, the rack end approach judging section 210 inputs the judging rack position Rx and the vehicle speed Vel and outputs the rack displacement x and the switching signal SWS. Another configurations are the same with FIG. 3 and the explanations are omitted.

The rack end approach judging section 210 activates the end hitting suppressing function when the judging rack position Rx is judged within the predetermined position $x_o$ at front of the rack end similar to the rack end approach judging section 110, and changes the predetermined position $x_o$ corresponding to the vehicle speed Vel. For example, by changing the predetermined position $x_o$ as shown in FIG. 38, the control range is enlarged by keeping the predetermined position $x_o$ from the rack end at a vehicle standstill and is narrowed by approaching the predetermined position $x_o$ to the rack end at a vehicle running.

In the above structure, an operation example of the present example will be described with reference to a flowchart of FIG. 39.

Figure 38:
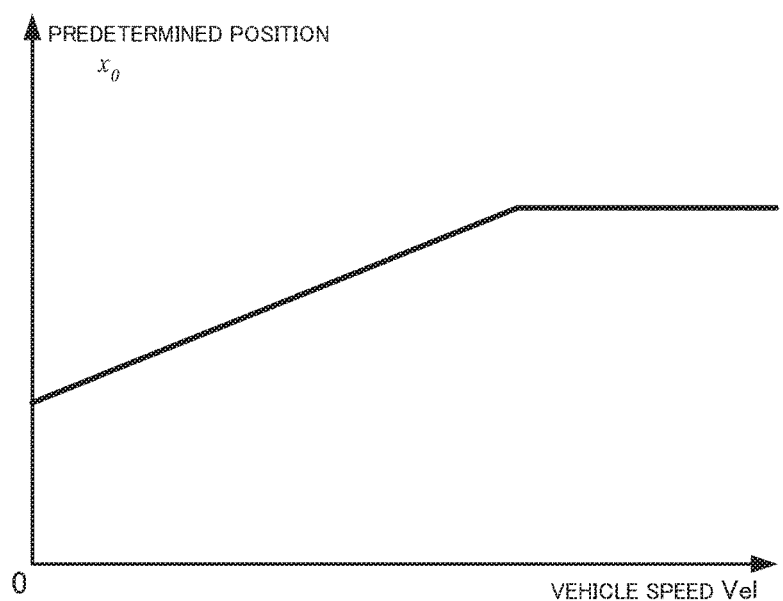
FIG. 38 is a diagram showing a characteristic example of a predetermined position corresponding to the vehicle speed.
Figure 39:
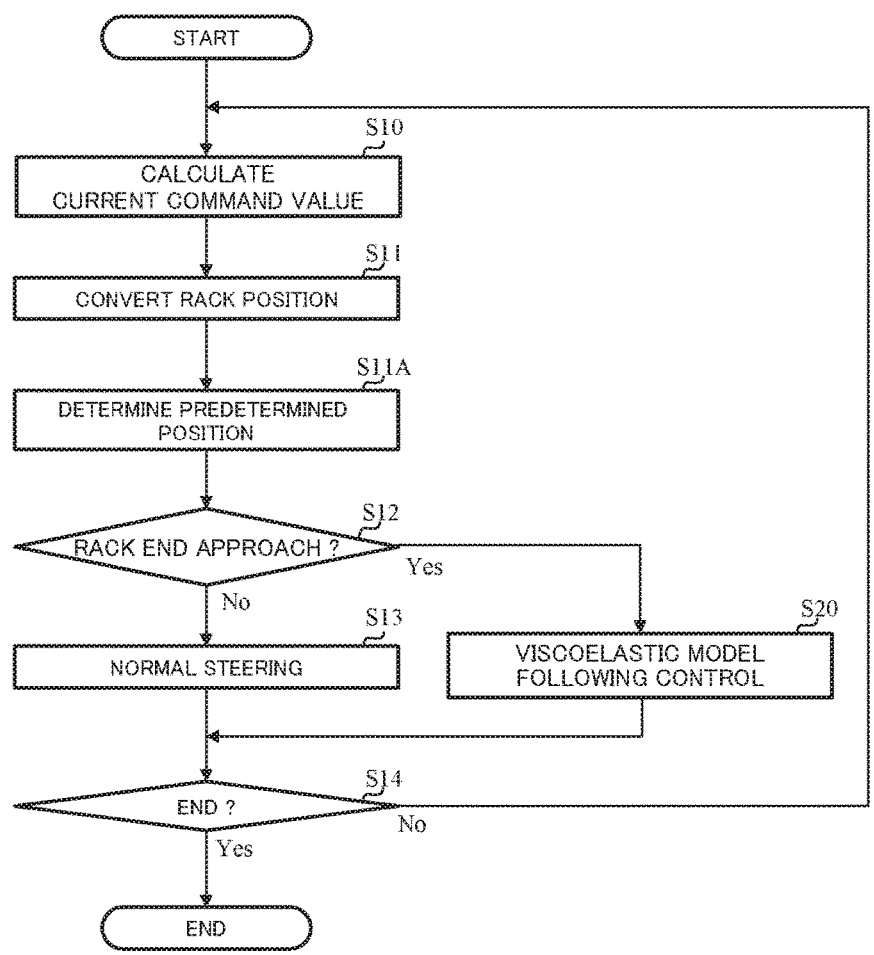
FIG. 39 is a flowchart showing an operation example (the tenth example) of the present invention.

FIG. 39 shows an overall operation with the flowchart, a Step S11A is inserted at a rear stage of the Step S11 to convert the rotational angle θ to the judging rack displacement Rx at the rack position converting section 100 in comparison with the flowchart of FIG. 7. At the Step S11A, the predetermined position $x_o$ is determined by using the characteristic shown in FIG. 38 based on the inputted vehicle speed Vel. Then, it is judged whether the steering is the rack end approach based on the predetermined position $x_o$ and the judging rack position Rx or not (Step S12). Another operations are the same with the operations of FIG. 7.

Besides, the characteristic of the predetermined position $x_o$ for the vehicle speed Vel is not limited to a linear as shown in FIG. 38, and it may be a curved characteristic.

The eleventh example will be described.

Although the predetermined position $x_o$ is changed corresponding to the vehicle speed Vel in the tenth example, in addition the spring constant $k_0$ and the viscous friction coefficient μ which are the parameters and the control parameters of the feed-back control section are also changed corresponding to the vehicle speed Vel in the eleventh example.

In the eleventh example, the control element section (Cd) of the feed-back control section comprises a configuration of the PD (Proportional-Differential)-control and the transfer function is expressed by the below Equation 35.

$$C_d = kp + kd \cdot s \quad \text{[Equation 35]}$$

where, kp is a proportional gain, kd is a differential gain and kp and kd are the control parameters of the feed-back control section.

Figure 40:
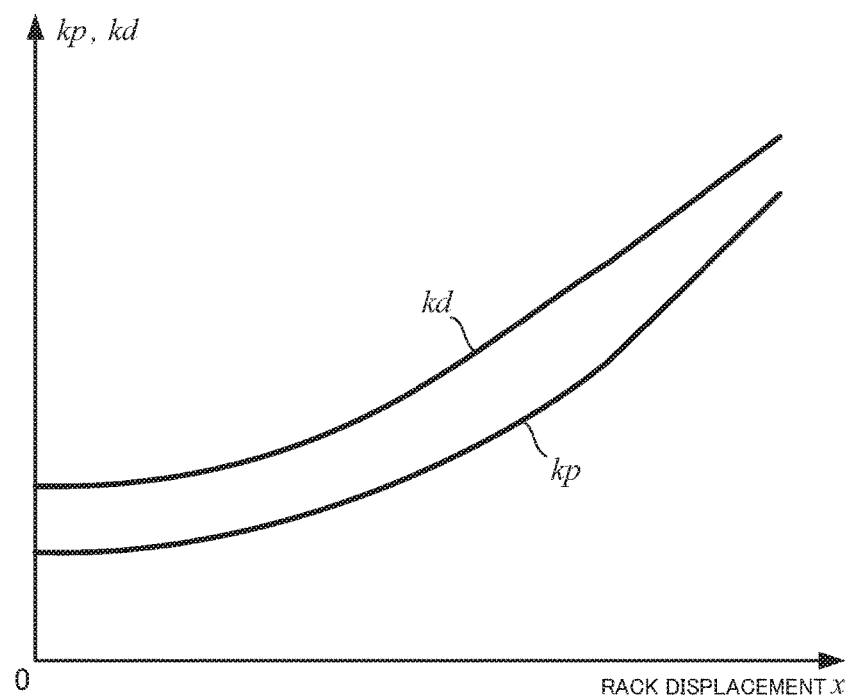
FIG. 40 is a diagram showing an example to change the control parameters due to the rack displacement.

The control parameters are changed based on the rack displacement. For example, as shown in FIG. 40, the control parameters are set so that the control gains are small at the neighborhood of the start steering angle and become large as approaching the rack end. Thus, since the controlled output becomes small and the change amount of the assist force in and out of control range becomes small, it is possible to suppress that a reaction force uncomfortable feeling due to the assist force-change gives to the driver. Further, since it is possible to enlarge the controlled output at a region near the rack end, it is capable of suppressing the shock force at a time when the steering reaches at the rack end.

Figure 41:
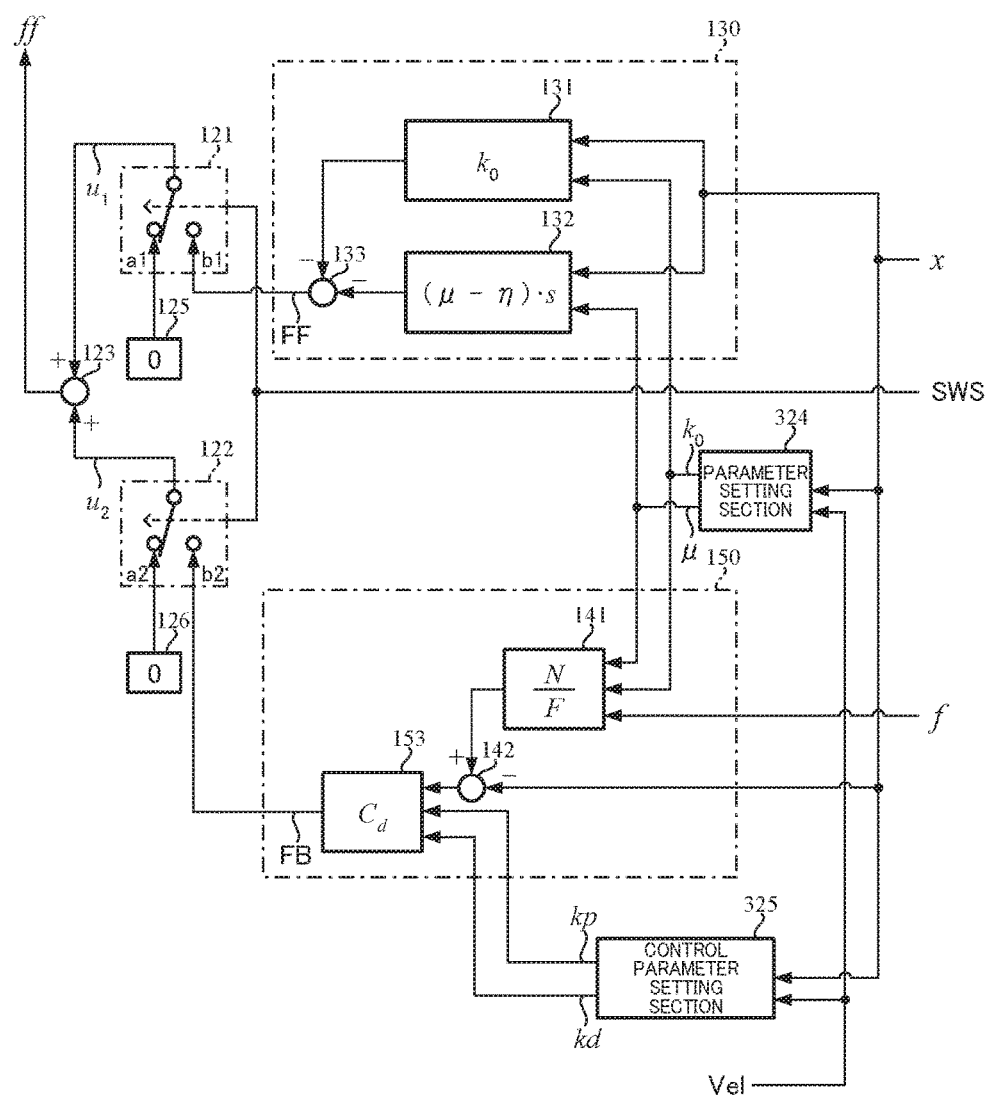
FIG. 41 is a block diagram showing a detailed configuration example (the eleventh example) of the viscoelastic model following control section.

FIG. 41 shows a configuration example of the viscoelastic model following control section in the eleventh example corresponding to the same with the second example shown in FIG. 15. In the eleventh example, a control parameter setting section 325 is newly added, and data inputted into the parameter setting section 324 and the control element section 153 in the feed-back control section 150 are increased. Another configurations are the same with the second example and the explanations are omitted.

The parameter setting section 324 outputs the model parameters (the spring constant $k_0$, the viscous friction coefficient μ) corresponding to the rack displacement x similar to the parameter setting section 124, and further inputs the vehicle speed Vel and changes the model parameters corresponding to the vehicle speed Vel. The parameter setting section 324 has model parameters (standstill model parameters) using at the standstill (the vehicle speed is "0") and model parameters using at the running (the vehicle speed is very slow such as the running at the creeping), and sets the model parameters corresponding to the vehicle speed by changing the adding-ratio the two model parameters in accordance with the vehicle speed. The standstill model parameters and the running model parameters are set in correspondence to the respective control ranges (respectively, a position of the rack end—the predetermined position $x_o$). That is, the characteristics of the parameters are respectively set so as to become the controlled output to stop within the control range. Concretely, the spring is weakly set so as to enlarge the control range at the vehicle standstill and is strongly set so as to narrow the control range at the vehicle running.

Figure 42:
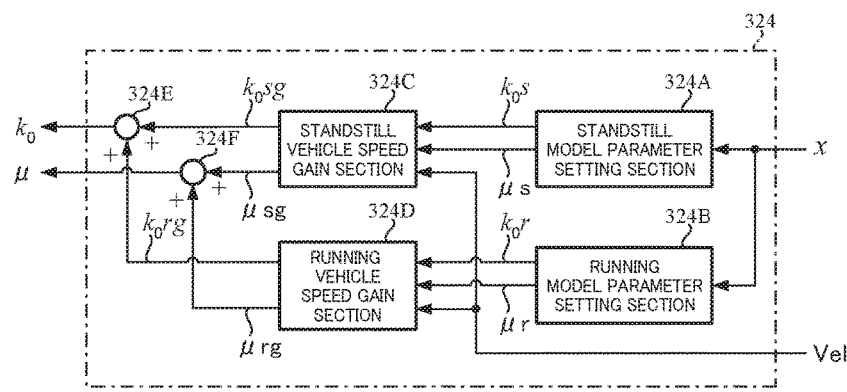
FIG. 42 is a block diagram showing a configuration example (the eleventh example) of the parameter setting section.
Figure 43:
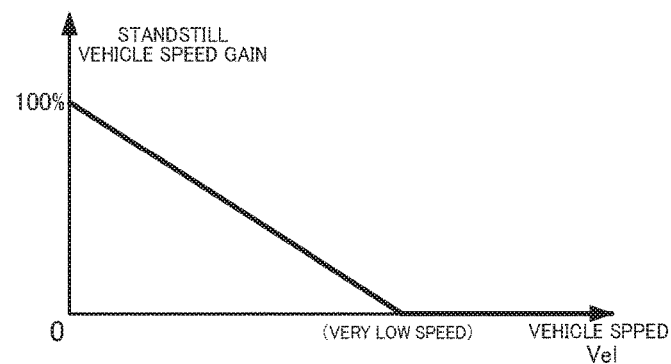
FIG. 43 is a diagram showing an example to change the stand-still vehicle speed gain corresponding to the vehicle speed.
Figure 44:
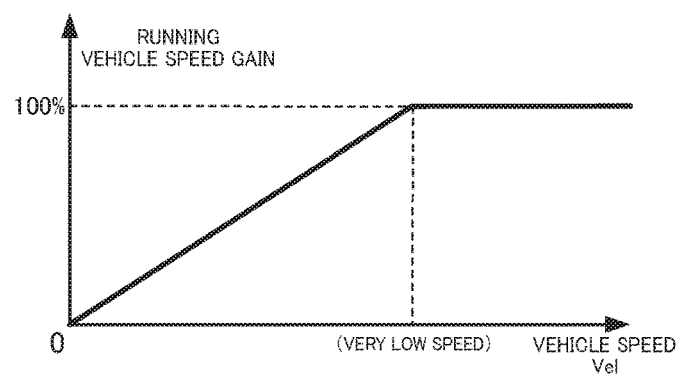
FIG. 44 is a diagram showing an example to change the running vehicle speed gain corresponding to the vehicle speed.

The configuration example of the parameter setting section 324 is shown in FIG. 42. The parameter setting section 324 comprises a standstill model parameter setting section 324A, a running model parameter setting section 324B, a standstill vehicle speed gain section 324C, a running vehicle speed gain section 324D and adding sections 324E, 324F. The rack displacement x inputting to the parameter setting section 324 is inputted into the standstill model parameter setting section 324A and the running model parameter setting section 324B, and the vehicle speed Vel is inputted into the standstill vehicle speed gain section 324C and the running vehicle speed gain section 324D. The standstill model parameter setting section 324A has a standstill model parameter, and determines the spring constant $k_0s$ and the viscous friction coefficient μs corresponding to the inputted rack displacement x and outputs them to the standstill vehicle speed gain section 324C. The running model parameter setting section 324B has a running model parameter, and determines the spring constant $k_0r$ and the viscous friction coefficient μr corresponding to the inputted rack displacement x and outputs them to the running vehicle speed gain section 324D. The standstill vehicle speed gain section 324C and the running vehicle speed gain section 324D determine vehicle speed gains (a standstill vehicle speed gain, a running vehicle speed gain) having asymmetrical characteristic as shown in FIGS. 43 and 44 corresponding to the vehicle speed Vel. Then, the standstill vehicle speed gain section 324C multiplies the spring constant $k_0s$ and the viscous friction coefficient μs with the standstill vehicle speed gain and outputs the spring constant $k_0sg$ and the viscous friction coefficient μsg. The running vehicle speed gain section 324D multiplies the spring constant $k_0r$ and the viscous friction coefficient μr with the running vehicle speed gain and outputs the spring constant $k_0rg$ and the viscous friction coefficient μrg. The spring constants $k_0sg$ and $k_0rg$ are added at the adding section 324E and the spring constant $k_0$ is outputted, and the viscous friction coefficients μsg and μrg are added at the adding section 324F and the viscous friction coefficients μ is outputted.

The control parameter setting section 325 outputs the control parameters (the proportional gain kp, the differential gain kd) corresponding to the rack displacement x, has the control parameters (the standstill control parameters) using at the vehicle standstill and the control parameters (the running control parameters) using at the vehicle running similarly to the parameter setting section 324, and sets the control parameters corresponding to the vehicle speed by changing the adding-ratio the two control parameters in accordance with the vehicle speed. The standstill control parameters and the running control parameters are set in correspondence to the respective control ranges. That is, the characteristics of the control parameters are set so as to enhance the end hitting suppressing effects at a narrow region by increasing a control responsibility as the control region becomes narrow. Concretely, the control parameters are weakly set so as to enlarge the control range at the vehicle standstill and are strongly set so as to narrow the control range at the vehicle running.

Figure 45:
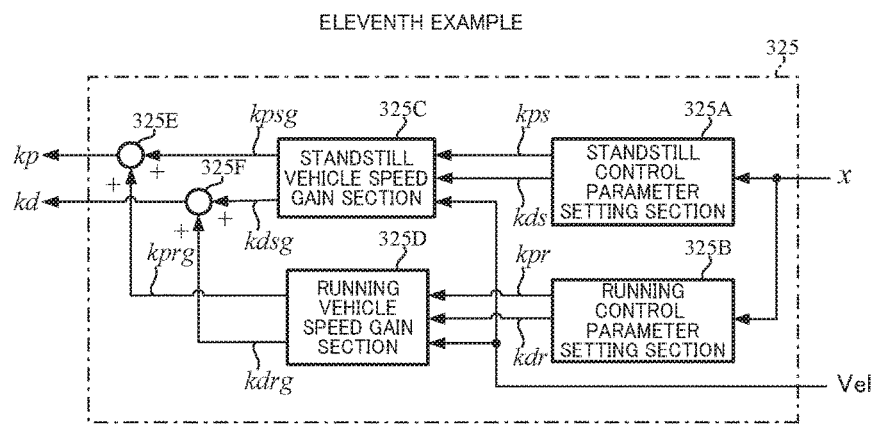
FIG. 45 is a block diagram showing a configuration example (the eleventh example) of the control parameter setting section.

The configuration example of the control parameter setting section 325 is shown in FIG. 45. The control parameter setting section 325 comprises a standstill control parameter setting section 325A, a running control parameter setting section 325B, a standstill vehicle speed gain section 325C, a standstill vehicle speed gain section 325D and adding sections 325E, 325F. The rack displacement x inputting to the control parameter setting section 325 is inputted into the standstill control parameter setting section 325A and the running control parameter setting section 325B, and the vehicle speed Vel is inputted into the standstill vehicle speed gain section 325C and the running vehicle speed gain section 325D. The standstill control parameter setting section 325A has standstill control parameters, and determines the proportional gain kps and the differential gain kds corresponding to the inputted rack displacement x and outputs them to the standstill vehicle speed gain section 325C. The running control parameter setting section 325B has running control parameters, and determines the proportional gain kpr and the differential gain kdr corresponding to the inputted rack displacement x and outputs them to the standstill vehicle speed gain section 325D. The standstill vehicle speed gain section 325C determines the standstill vehicle speed gain based on an equivalent characteristic to the characteristic shown in FIG. 43 in the standstill vehicle speed gain section 324C, and multiplies the proportional gain kps and the differential gain kds with the standstill vehicle speed gain and outputs the proportional gain kpsg and the differential gain kdsg. The running vehicle speed gain section 325D determines the running vehicle speed gain based on an equivalent characteristic to the characteristic shown in FIG. 44 in the running vehicle speed gain section 324D, and multiplies the proportional gain kpr and the differential gain kdr with the running vehicle speed gain and outputs the proportional gain kprg and the differential gain kdrg. The proportional gains kpsg and kdrg are added at the adding section 325E and the proportional gain kp is outputted, and the differential gains kdsg and kdrg are added at the adding section 325F and the differential gain kd is outputted.

The control element section 153 in the feed-back control section 150 converts the output from the subtracting section 142 by using the control parameters (the proportional gain kp and the differential gain kd) outputted from the control parameter setting section 325 and outputs the rack axial force FB.

In such the configuration, the operation example of the eleventh example will be described with reference to flowcharts of FIGS. 46 and 47.

Figure 46:
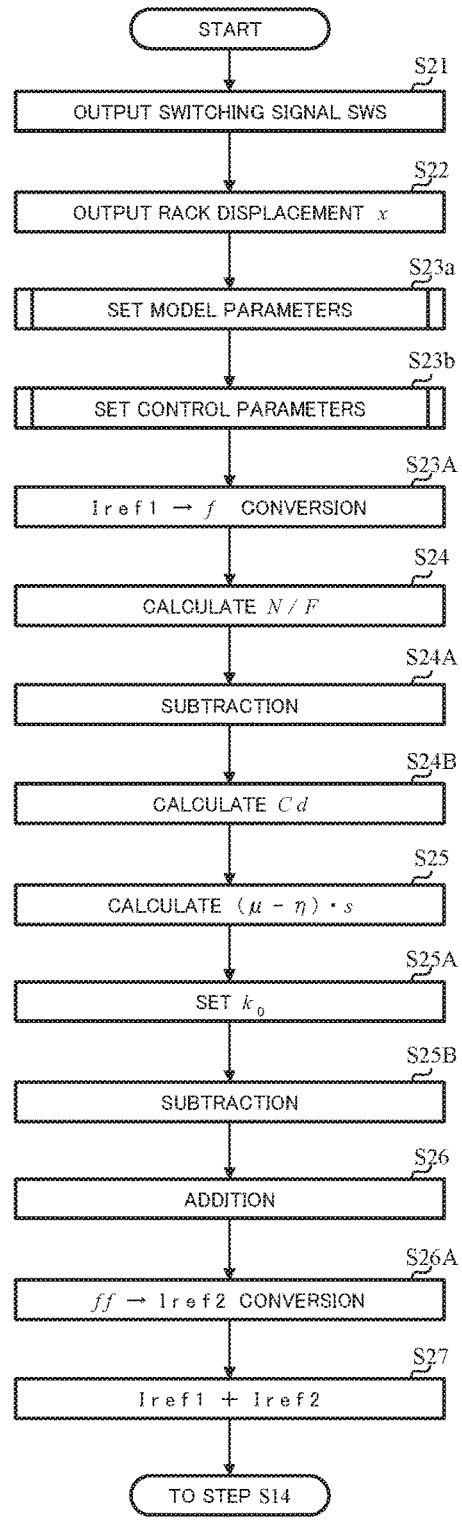
FIG. 46 is a flowchart showing an operation example (the eleventh example) of the viscoelastic model following control section.
Figure 47:
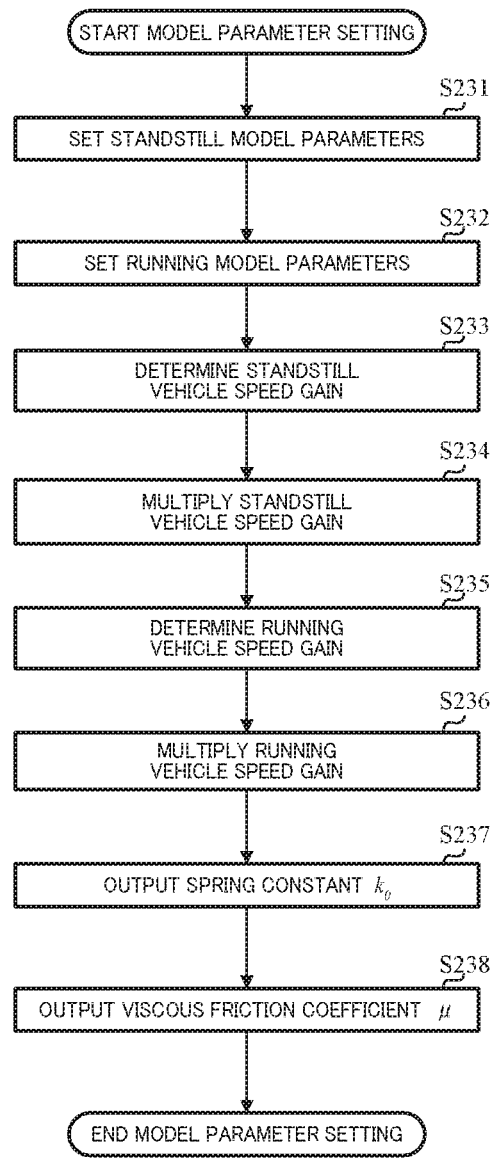
FIG. 47 is a flowchart showing an operation example (the twelfth example) of the parameter setting section.

FIG. 46 is a flowchart to show an operation example of the viscoelastic model following control (Step S20) in the flowchart shown in FIG. 39, and the Step S23a is substituted for the Step S23 and the Step S23b is inserted thereafter in comparison with the second example shown in FIG. 17. Another operations are the same with the flowchart of FIG. 17.

At the Step S23a, the parameter setting section 324 sets the model parameters. FIG. 47 shows an operation example to set the model parameters. The standstill model parameter setting section 324A inputs the rack displacement x and outputs the spring constant $k_0s$ and the viscous friction coefficient μs as the standstill model parameters corresponding to the rack displacement x (Step S231). The running model parameter setting section 324B also inputs the rack displacement x and outputs the spring constant $k_0r$ and the viscous friction coefficient μr as the running model parameters corresponding to the rack displacement x (Step S232). The order of the Steps S231 and S232 may be inverse.

The standstill vehicle speed gain section 324C inputs the vehicle speed Vel with the spring constant $k_0s$ and the viscous friction coefficient μs, determines the standstill vehicle speed gain corresponding to the vehicle speed Vel by using the characteristic shown in FIG. 43 (Step S233), and multiplies the spring constant $k_0s$ and the viscous friction coefficient μs with the standstill vehicle speed gain and outputs the spring constant $k_0sg$ and the viscous friction coefficient μsg (Step S234). The running vehicle speed gain section 324D inputs the vehicle speed Vel with the spring constant $k_0r$ and the viscous friction coefficient μr, determines the running vehicle speed gain corresponding to the vehicle speed Vel by using the characteristic shown in FIG. 44 (Step S235), and multiplies the spring constant $k_0r$ and the viscous friction coefficient μr with the running vehicle speed gain and outputs the spring constant $k_0rg$ and the viscous friction coefficient μrg (Step S236). The orders of the Steps S233, S234 and Steps S235, 236 may be inverse respectively. The outputted spring constant $k_0sg$ and $k_0rg$ are inputted into the adding section 324E, and the added result is outputted as the spring constant $k_0$ (Step S237). The outputted viscous friction coefficients μsg and μrg are inputted into the adding section 324F, and the added result is outputted as the viscous friction coefficient μ (Step S238). The order of the Steps S237 and S238 may be inverse.

At the Step S23b, the control parameter setting section 325 sets the control parameters (the proportional gain kp and the differential gain kd) with the same operation that the parameter setting section 324 sets the model parameters.

As well, the vehicle speed gains (the standstill vehicle speed gain, the running vehicle speed gain) multiplying with the model parameters may be not same with the vehicle speed gains multiplying with the control parameters. The standstill vehicle speed gain and the running vehicle speed gain may be different characteristics as shown in FIG. 43 and FIG. 44 with a satisfaction that the standstill vehicle speed gain is 100% at the vehicle standstill and the running vehicle speed gain is 100% at the vehicle running. Although the model parameters and the control parameters are changeable based on the rack displacement, they may be not changeable.

The twelfth example will be described.

Although the predetermined position $x_0$ is changed based on the vehicle speed Vel in the tenth example and the model parameters and the control parameters are further changed in the eleventh example, the reference model is also changed in this twelfth example.

Figure 48:
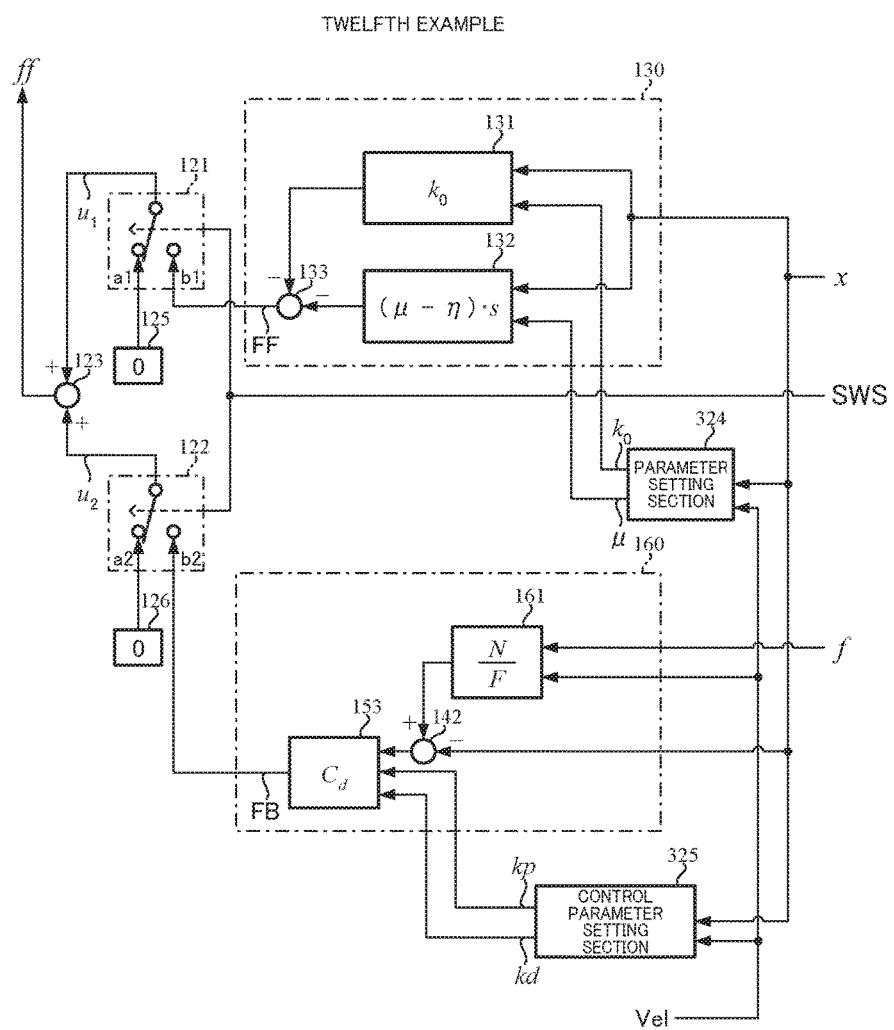
FIG. 48 is a block diagram showing a detailed configuration example (the twelfth example) of the viscoelastic model following control section.

A configuration example of the viscoelastic model following section in the twelfth example is shown in FIG. 48. In comparison with the viscoelastic model following section of the eleventh example shown in FIG. 41, in the twelfth example, the feed-back element (N/F) 161 is substituted for the feed-back element (N/F) 141, and the vehicle speed Vel in place of the spring constant $k_0$ and the viscous friction coefficient μ from the parameter setting section 324 is inputted into the feed-back element (N/F) 161. Another configurations are the same with the eleventh example and the explanations are omitted.

The feed-back element (N/F) 161 of the feed-back control section 160 includes the reference model similar to the feed-back element 141. That is, the feed-back element (N/F) 161 has a reference model (a standstill reference model) to use at the vehicle standstill and a reference model (a running reference model) to use at the vehicle running and calculates the N/F-calculated value (the target rack displacement) by using the above two reference models. The ratio to use is changed corresponding to the vehicle speed. The standstill reference model and the running reference model are respectively set in accordance with the control regions of the vehicle standstill and the vehicle running. That is, the characteristic of the reference model is adjusted so that the narrower the control region is, the smaller the target rack displacement is. Concretely, the spring is weakly set so as to enlarge the control range at the vehicle standstill and is strongly set so as to narrow the control range at the vehicle running.

Figure 49:
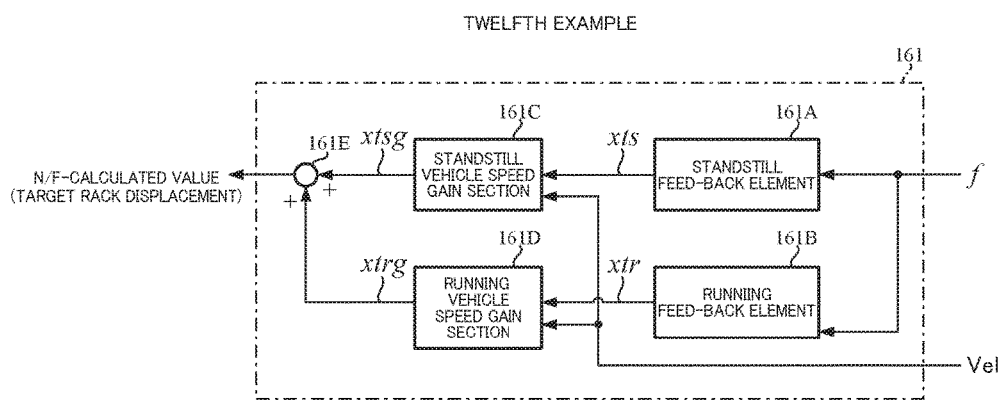
FIG. 49 is a block diagram showing a configuration example (the twelfth example) of the feed-back element (N/F)

A configuration example of the feed-back element (N/F) 161 is shown in FIG. 49. The feed-back element (N/F) 161 comprises a standstill feed-back element 161A, a running feed-back element 161B, a standstill vehicle speed gain section 161C, a running vehicle speed gain section 161D and adding section 161E. The standstill feed-back element 161A N/F-calculates for the rack axial force f by using the standstill reference model, and outputs a target rack displacement xts. The running feed-back element 161B N/F-calculates for the rack axial force f by using the running reference model, and outputs a target rack displacement xtr. The standstill vehicle speed gain section 161C determines a standstill vehicle speed gain corresponding to the vehicle speed Vel in accordance with a characteristic equivalent to the characteristic shown in FIG. 43, and multiplies with the target rack displacement xts and outputs the target rack displacement xtsg. The running vehicle speed gain section 161D determines a running vehicle speed gain corresponding to the vehicle speed Vel in accordance with a characteristic equivalent to the characteristic shown in FIG. 44, and multiplies with the target rack displacement xtr and outputs the target rack displacement xtrg. The target rack displacements xtsg and xtrg are added at the adding section 161E.

In such the configuration, the operation example of the twelfth example will be described with reference to flowcharts of FIGS. 50 and 51.

Figure 50:
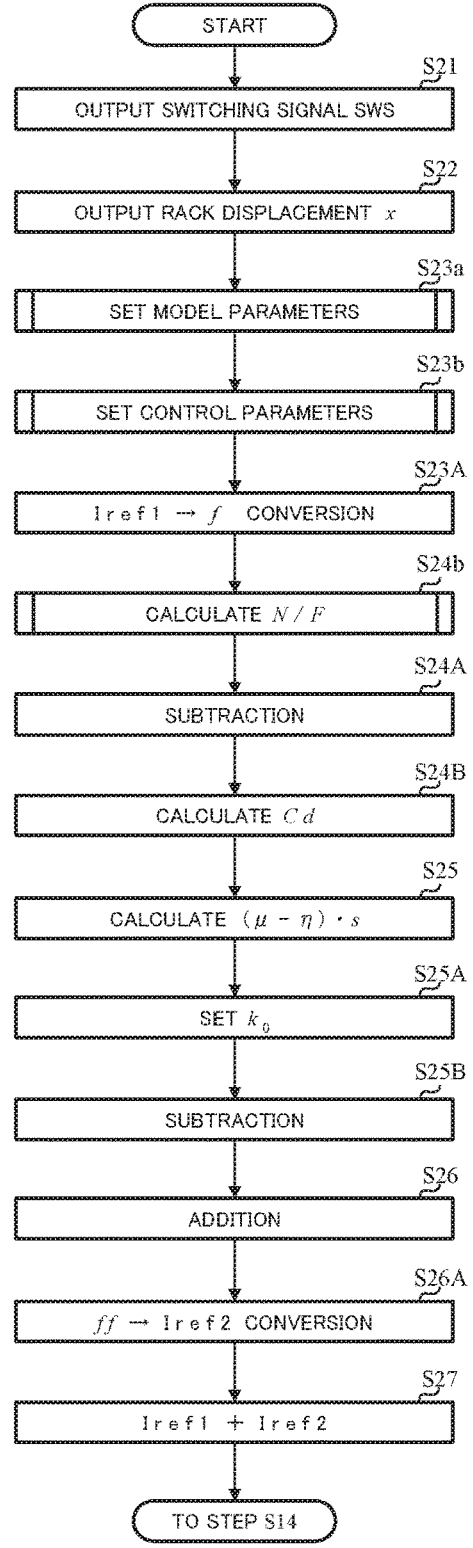
FIG. 50 is a flowchart showing an operation example (the twelfth example) of the viscoelastic model following control section.
Figure 51:
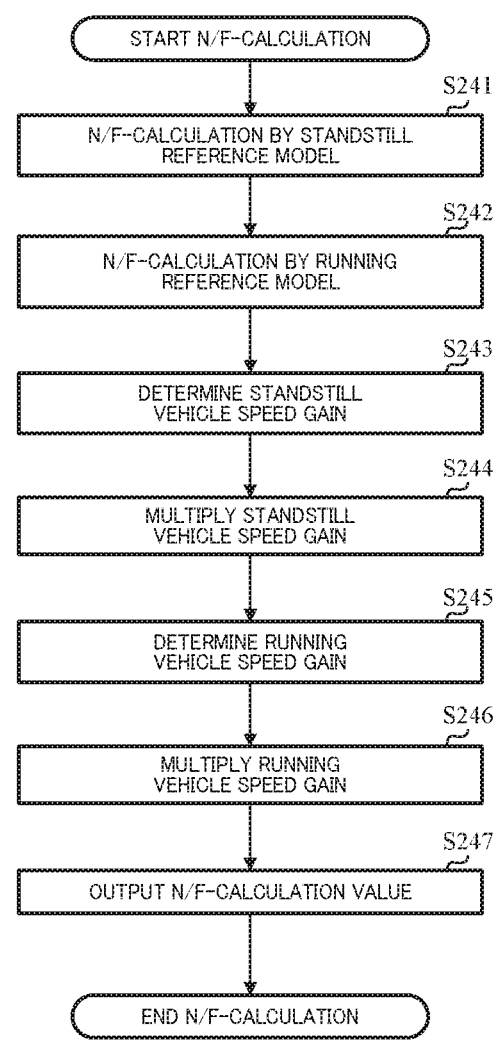
FIG. 51 is a flowchart showing an operation example (the twelfth example) of the feed-back element (N/F)

FIG. 50 is a flowchart to show an operation example of the viscoelastic model following control in the twelfth example, and the Step S24b is substituted for the Step S24 in comparison with the operation of the eleventh example shown in FIG. 46. Although another operations are the same, the model parameters outputted from the parameter setting section 324 are inputted into only the feed-forward control section 130 at the Step 23b.

At the Step S24b, the feed-back element (N/F) 161 N/F-calculates the rack axial force f. FIG. 51 is a flowchart to show the operation example of the N/F-calculation. The standstill feed-back element 161A N/F-calculates the inputted rack axial force f by using a predetermined standstill reference model and outputs a target rack displacement xts (Step S241). Similarly, the running feed-back element 161B N/F-calculates the inputted rack axial force f by using a predetermined running reference model and outputs a target rack displacement xtr (Step S242). The order of the Steps S241 and 242 is changeable.

The standstill vehicle speed gain section 161C inputs the vehicle speed Vel with the target rack displacement xts, determines the standstill vehicle speed gain for the vehicle speed Vel by using the characteristic shown in FIG. 43 (Step S243), and multiplies the target rack displacement xts with the standstill vehicle speed gain and outputs the target rack displacement xtsg (Step S244). Similarly, the running vehicle speed gain section 161D inputs the vehicle speed Vel with the target rack displacement xtr, determines the running vehicle speed gain for the vehicle speed Vel by using the characteristic shown in FIG. 44 (Step S245), and multiplies the target rack displacement xtr with the running vehicle speed gain and outputs the target rack displacement xtrg (Step S246). The orders of Steps S243, S244 and Steps S245, S246 may be respectively inverse. The outputted target rack displacements xtsg and xtrg are added at the adding section 161E, and the added result is outputted as a final N/F-calculated value (the target rack displacement) (Step S247).

As well, the vehicle speed gains (the standstill vehicle gain, the running vehicle gain) multiplying with the target rack displacement may be not the same characteristics of the vehicle speed gains multiplying with the model parameters and the control parameters.

The thirteenth example will be described.

Although the model parameters and the control parameters changed corresponding to the rack displacement x are changed by further the vehicle speed Vel in the eleventh example, the model parameters and the control parameters are changed corresponding to the control displacement x' calculated by multiplying the vehicle speed gain set based on the vehicle speed Vel with the rack displacement x in the thirteenth example. Since the predetermined position $x_o$ (the start steering angle) varies corresponding to the vehicle speed Vel, the model parameters and the control parameters are set by changing a range of the rack displacement x corresponding to the vehicle speed Vel. Although the start steering angle varies corresponding to the vehicle speed Vel, the rack displacement x is multiplied with the vehicle speed gain so that the control displacement x' acts within the target control region serving as a reference. Therefore, the target rack end steering angle becomes constant.

Figure 52A:
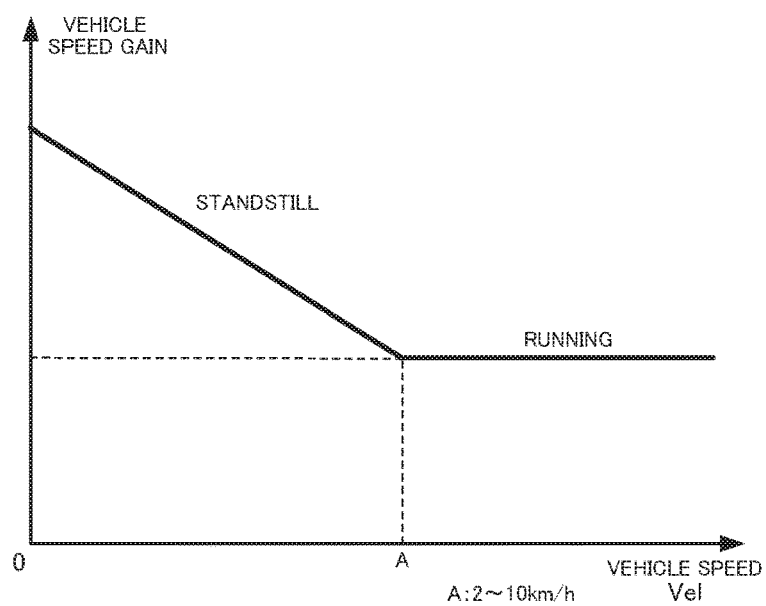
FIGS. 52A and 52B are diagrams showing an example to change the vehicle speed gain corresponding to the vehicle speed.

The vehicle speed gain is set so that the range of the control displacement x' for the rack displacement x becomes large since the control region is enlarged by reducing the start steering angle at the vehicle standstill and the range of the control displacement x' for the rack displacement x becomes small since the control region is narrowed by increasing the start steering angle at the vehicle running. For example, as shown in FIG. 52A, the vehicle speed gain of the start steering angle is set so that the gain for the vehicle speed of the control region and the gain of the control displacement x' for the displacement x have a proportional relation. For example, when a steering angle to the predetermined position $x_0$ at the vehicle standstill is 520 [deg], a steering angle to the predetermined position $x_0$ at the vehicle running is 530 [deg] and a steering angle to the rack end is 550 [deg], the control region at the vehicle standstill is 30 [deg] and the control region at the vehicle running is 20 [deg]. Accordingly, the vehicle speed gain at the vehicle standstill is set to "1" and the vehicle speed gain at the vehicle running is set to "2/3" in a case that the model parameters and the control parameters are matched to the characteristic of the vehicle standstill. The vehicle speed gain at the vehicle running is set to "1" and the vehicle speed gain at the vehicle standstill is set to "3/2" in a case that the model parameters and the control parameters are matched to the characteristic of the vehicle running.

Figure 53:
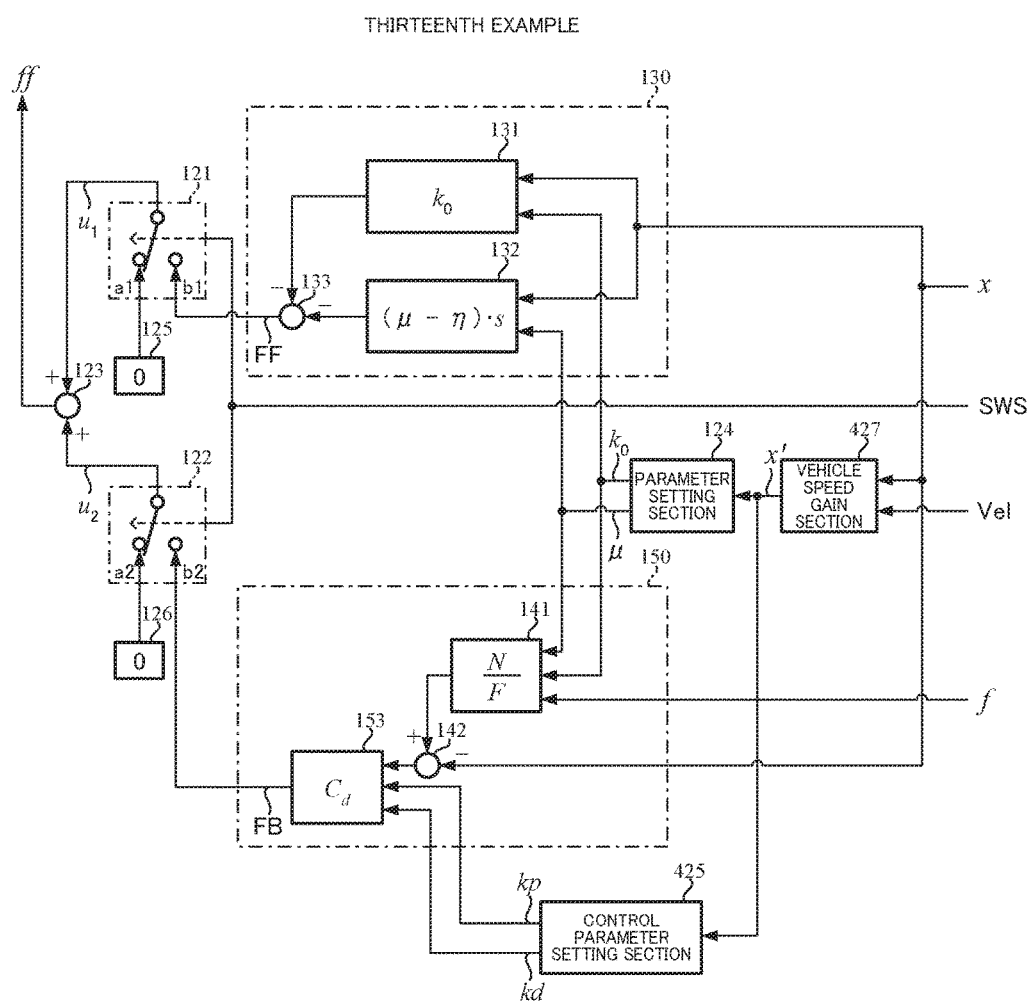
FIG. 53 is a block diagram showing a detailed configuration example (the thirteenth example) of the viscoelastic model following control section.

FIG. 53 is a block diagram to show a configuration example of the viscoelastic model following control in the thirteenth example, and a vehicle speed gain section 427 is newly added and a control parameter setting section 425 is substituted for the control parameter setting section 325. Further, although the control parameter setting section 324 is substituted for the control parameter setting section 124 in the second example, the control displacement x' outputted from the vehicle speed gain section 427 in place of the rack displacement x. Another configurations are the same of the eleventh example and the explanations are omitted.

The vehicle speed gain section 427 determines the vehicle speed gain corresponding to the vehicle speed Vel by using the characteristic shown in FIG. 52A, and multiplies with the rack displacement x and outputs the control displacement x'. The control parameter setting section 425 has the control parameters (the proportional gain kp, the differential gain kd) independent on the vehicle speed Vel, the control parameters have the characteristics as shown in FIG. 40 and are set corresponding to the rack displacement x'. In FIG. 40, the quadrature axis is not the rack displacement x but the control displacement x'. The parameter setting section 124 merely changes the input from the rack displacement x to the control displacement x', and the configurations and the operations are the same with the parameter setting section 124 in the second example.

In such the configuration, the operation example of the thirteenth example will be described with reference to a flowchart of FIG. 54.

Figure 54:
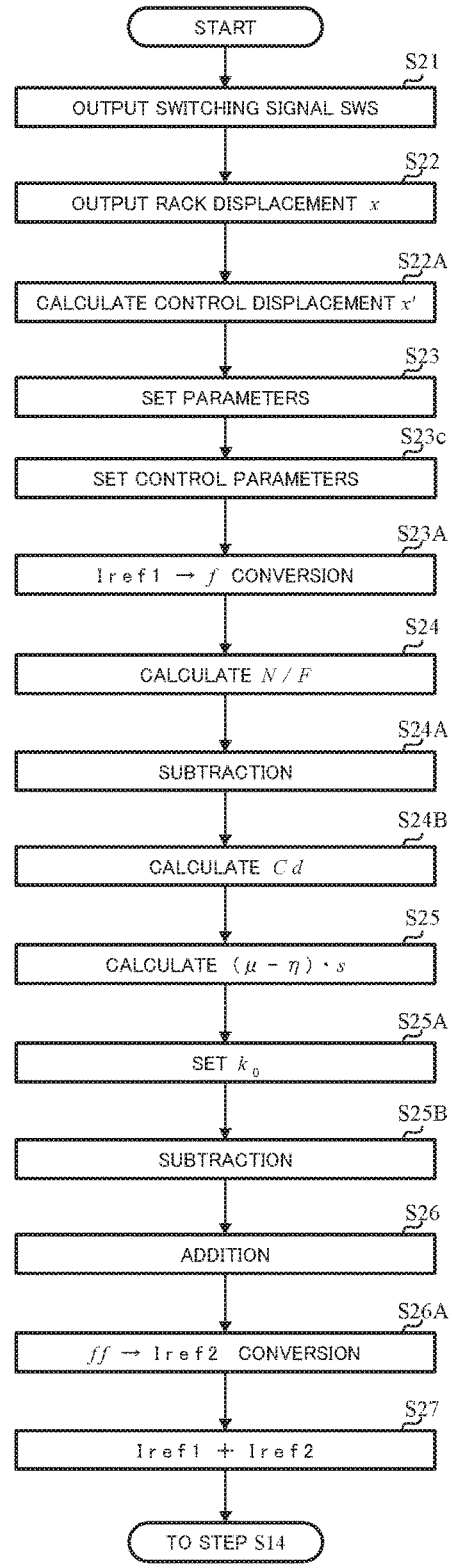
FIG. 54 is a flowchart showing an operation example (the thirteenth example) of the viscoelastic model following control section.

FIG. 54 is a flowchart to show an operation example of the viscoelastic model following control in the thirteenth example, and the Step S22A is inserted at rear of the Step 22 as well as the steps S23 and S23c are respectively substituted for the Step S23a and S23b in comparison with the operation of the eleventh example shown in FIG. 46. Another operations are the same.

At the Step S22A, the vehicle speed gain section 427 inputs the rack displacement x and the vehicle speed Vel, determines the vehicle speed gain by using the characteristic shown in FIG. 52A, and multiplies the rack displacement x with the vehicle speed gain and calculates the control displacement x'. The control displacement x' is inputted into the parameter setting section 124 and the control parameter setting section 425. The parameter setting section 124 sets the model parameters (the spring constant $k_0$ and the viscous friction coefficient μ) obtained due to an equivalent characteristic to the characteristic shown in FIG. 16 corresponding to the control displacement x' in the spring constant term 131, the viscous friction coefficient term 132 and the feed-back element (N/F) 141 (Step S23). The control parameter setting section 425 sets the control parameters (the proportional gain kp and the differential gain kd) obtained due to an equivalent characteristic to the characteristic shown in FIG. 40 corresponding to the control displacement x' in the control element section 153 (Step S23c).

Figure 52B:
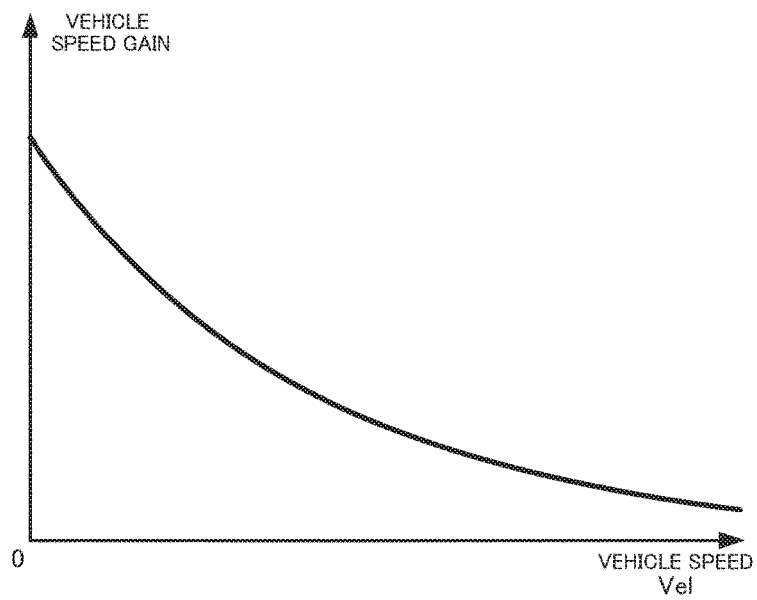

The characteristic of the vehicle speed gain for the vehicle speed Vel is not limited to characteristic as shown in FIG. 52A. If the vehicle speed gain at the vehicle standstill is larger than the one at the vehicle running, it may be a curved characteristic as shown in FIG. 52B.

Although the control element section 153 comprises PD-configuration in the eleventh to thirteenth examples, it may PID-control or PI-control. In a case of PID-configuration, the transfer function is expressed by the below Equation 36, and the proportional gain kp, the differential gain kd and the integral gain ki are the control parameters. Further, the integral gain ki has characteristics similar to the proportional gain kp and the differential gain kd.

$$C_d = kp + kd \cdot s + \frac{ki}{s} \quad \text{[Equation 36]}$$

In a case of the PI-configuration, the transfer function is expressed as follows.

$$C_d = kp + \frac{ki}{s} \quad \text{[Equation 37]}$$

As the transfer function of the control element section 153 with the PD-control, the following Equation 38 used the differential time Td in place of the differential gain kd may be used.

$$C_d = kp(1 + Ts \cdot s) \quad \text{[Equation 38]}$$

In this case, the proportional gain kp and the differential time Td are the control parameters. Similarly, the integral time Ti may use in place of the integral gain ki in the PID-control or the PI-control.

Further, for the viscoelastic model following control section in the first example shown in FIG. 14, it is possible to adopt, in the same aspects, the addition and variations performed for the same in the second example in the eleventh to thirteenth examples. In the tenth to thirteenth examples, the viscoelastic model following control section may comprises only the feed-back control section without the configuration of the feed-forward control section and the feed-back control section.

EXPLANATION OF REFERENCE NUMERALS 1 handle
2 column shaft (steering shaft, handle shaft)
10 torque sensor
12 vehicle speed sensor
13 battery
14 steering angle sensor
20 motor
21 rotational angle sensor
30 control unit (ECU)
31 torque control section
35 current control section
36 PWM-control section
100 rack position converting section
110 rack end approach judging section
120, 220, 320 viscoelastic model following control section
121, 122 switching section
124, 324 parameter setting section
127, 128, 128A, 128B, 327, 328 noise reducing section
130 feed-forward control section
140 feed-back control section
150 motor angular velocity calculating section
160 rack displacement velocity calculating section
161A standstill feed-back element
161B running feed-back element
161C, 324C, 325C standstill vehicle speed gain section
161D, 324D, 325D running vehicle speed gain section
170, 270 change-amount limiting section
324A standstill model parameter setting section
324B running model parameter setting section
325, 425 control parameter setting section
325A standstill control parameter setting section
325B running control parameter setting section
427 vehicle speed gain section

The invention claimed is:
1. An electric power steering apparatus that calculates a first current command value based on at least a steering torque and performs an assist-control of a steering system by driving a motor based on said first current command value, comprising:
- a first converting section to convert said first current command value to a first rack axial force;
- a rack position converting section to convert a rotational angle of said motor to a judgment rack position;
- a rack end approach judging section to judge that a steering approaches to a rack end based on said judgment rack position and to output a rack displacement and a switching signal;
- a viscoelastic model following control section to generate, with a configuration of a model following control, a second rack axial force including a viscoelastic model as a reference model based on said rack axial force, said rack displacement and said switching signal; and
- a second converting section to convert said second rack axial force to a second current command value;
- wherein said viscoelastic model following control section comprising:
- a feed-back control section to feed-back control based on said rack displacement and said first rack axial force and to output said second rack axial force;
- a switching section to switch-ON/OFF an output of said second rack axial force by said switching signal; and
- at least one noise reducing section to reduce a noise included in said rack displacement or said first rack axial force by a noise-reducing function;
- wherein said assist-control is performed by adding said second current command value to said first current command value so as to suppress a rack end hitting.

2. The electric power steering apparatus according to claim 1, wherein said noise reducing section is provided at a front stage of input of said first rack axial force into said feed-back control section.

3. The electric power steering apparatus according to claim 1, wherein said noise reducing section is provided at a rear stage of output of said second rack axial force from said switching section.

4. The electric power steering apparatus according to claim 1, wherein said noise reducing section is provided at a front stage of input of said rack displacement into said feed-back control section.

5. The electric power steering apparatus according to claim 1, wherein said noise reducing section is provided within said feed-back control section.

6. The electric power steering apparatus according to claim 1, wherein said noise reducing section has a characteristic varying corresponding to a steering velocity information.

7. The electric power steering apparatus according to claim 6, wherein a characteristic of said noise reducing section is that a smaller said steering velocity information is, a larger a rate to reduce said noise is.

8. The electric power steering apparatus according to claim 6, wherein said characteristic of said noise reducing section is gradually changed in accordance with a variation of said steering velocity information.

9. The electric power steering apparatus according to claim 1, wherein parameters of said feed-back control section are changed corresponding to said rack displacement.

10. The electric power steering apparatus according to claim 1, wherein said first rack axial force and said second rack axial force are respectively equivalent to a first column axial torque and a second column axial torque.

11. An electric power steering apparatus that calculates a first current command value based on at least a steering torque and performs an assist-control of a steering system by driving a motor based on said first current command value, comprising:
- a first converting section to convert said first current command value to a first rack axial force;
- a rack position converting section to convert a rotational angle of said motor to a judgment rack position;
- a rack end approach judging section to judge that a steering approaches to a rack end based on said judgment rack position and to output a rack displacement and a switching signal;
- a viscoelastic model following control section to generate, with a configuration of a model following control, a second rack axial force including a viscoelastic model as a reference model based on said first rack axial force, said rack displacement and said switching signal;
- a change-amount limiting section to change said second rack axial force so that a change amount of said second rack axial force becomes said predetermined value when said change amount exceeds said predetermined value; and
- a second converting section to convert said second rack axial force to a second current command value;
- wherein said assist-control is performed by adding said second current command value to said first current command value so as to suppress a rack end hitting.

12. The electric power steering apparatus according to claim 11, comprising:
- wherein said viscoelastic model following control section comprising:
- a feed-forward control section to feed-forward control based on said first rack axial force and to output a third rack axial force;
- a feed-back control section to feed-back control based on said rack displacement and said first rack axial force and to output a fourth rack axial force;
- a first switching section to switch-ON/OFF an output of said third rack axial force by said switching signal;
- a second switching section to switch-ON/OFF an output of said fourth rack axial force by said switching signal; and
- an adding section to output said second rack axial force by adding said outputs of said first and second switching sections.

13. The electric power steering apparatus according to claim 11, comprising:
- wherein said viscoelastic model following control section comprising:
- a feed-forward control section to feed-forward control based on said rack displacement and to output a third rack axial force;
- a feed-back control section to feed-back control based on said rack displacement and said first rack axial force and to output a fourth rack axial force;
- a first switching section to switch-ON/OFF an output of said third rack axial force by said switching signal;
- a second switching section to switch-ON/OFF an output of said fourth rack axial force by said switching signal; and
- an adding section to output said second rack axial force by adding said outputs of said first and second switching sections.

14. The electric power steering apparatus according to claim 12, wherein parameters of said feed-back control section and said feed-forward control section are changed corresponding to said rack displacement.

15. The electric power steering apparatus according to claim 13, wherein parameters of said feed-back control section and said feed-forward control section are changed corresponding to said rack displacement.

16. The electric power steering apparatus according to claim 11, wherein said predetermined value of said change-amount limiting section is changed by a sign of a change amount of said second rack axial force.

17. The electric power steering apparatus according to claim 11, wherein said predetermined value of said change-amount limiting section is changed by "ON/OFF" of a rack end approach judgment.

18. The electric power steering apparatus according to claim 11, wherein said predetermined value of said change-amount limiting section is changed by a steering information.

19. The electric power steering apparatus according to claim 18, wherein said predetermined value of said change-amount limiting section is changed so as to be larger near rack end.

20. The electric power steering apparatus according to claim 11, wherein said first rack axial force and said second rack axial force are respectively equivalent to a first column axial torque and a second column axial torque.

21. The electric power steering apparatus according to claim 12, wherein said first rack axial force, said second rack axial force, a third rack axial force and a fourth rack axial force are respectively equivalent to a first column axial torque, a second column axial torque, a third column axial torque and a fourth column axial torque.

22. The electric power steering apparatus according to claim 13, wherein said first rack axial force, said second rack axial force, a third rack axial force and a fourth rack axial force are respectively equivalent to a first column axial torque, a second column axial torque, a third column axial torque and a fourth column axial torque.

23. An electric power steering apparatus that calculates a first current command value based on at least a steering torque and performs an assist-control of a steering system by driving a motor based on said first current command value, comprising:
a first converting section to convert said first current command value to a first rack axial force;
a rack position converting section to convert a rotational angle of said motor to a judgment rack position;
a rack end approach judging section to judge that a steering approaches to a rack end based on said judgment rack position and to output a rack displacement and a switching signal;
a viscoelastic model following control section to generate, with a configuration of a model following control, a second rack axial force including a viscoelastic model as a reference model based on said rack axial force, said rack displacement and said switching signal; and
a second converting section to convert said second rack axial force to a second current command value;
wherein said viscoelastic model following control section comprising:
a feed-back control section to feed-back control based on said rack displacement and said first rack axial force and to output said third rack axial force; and
a first switching section to switch-ON/OFF an output of said third rack axial force by said switching signal;
wherein an output from said first switching section is outputted as said second rack axial force, and said rack end approach judging section judges that a steering approaches said rack end by that said judging rack position is within a predetermined position at front of said rack end and changes said predetermined position corresponding to said vehicle speed,
wherein said assist-control is performed by adding said second current command value to said first current command value so as to suppress a rack end hitting.

24. The electric power steering apparatus according to claim 23, wherein said viscoelastic model following control section further including:
a feed-forward control section to feed-forward control based on said first rack axial force and to output a fourth rack axial force;
a second switching section to switch-ON/OFF an output of said fourth rack axial force by said switching signal; and
an adding section to output said second rack axial force by adding said outputs of said first and second switching sections.

25. The electric power steering apparatus according to claim 23, wherein said viscoelastic model following control section further including:
a feed-forward control section to feed-forward control based on said rack displacement and to output a fourth rack axial force;
a second switching section to switch-ON/OFF an output of said fourth rack axial force by said switching signal; and
an adding section to output said second rack axial force by adding said outputs of said first and second switching sections.

26. The electric power steering apparatus according to claim 23, wherein said viscoelastic model following control has a standstill reference model and a running reference model as said reference model, and a ratio to use said standstill reference model and said running reference model is changed corresponding to said vehicle speed.

27. The electric power steering apparatus according to claim 23, wherein said viscoelastic model following control changes parameters of said reference model corresponding to said rack displacement.

28. The electric power steering apparatus according to claim 26, wherein said viscoelastic model following control changes parameters of said reference model corresponding to said rack displacement.

29. The electric power steering apparatus according to claim 23, wherein said viscoelastic model following control has standstill model parameters and running model parameters as parameters of said reference model, and said parameters of said reference model are changed between said standstill model parameters and said running model parameters corresponding to said vehicle speed.

30. The electric power steering apparatus according to claim 26, wherein said viscoelastic model following control has standstill model parameters and running model parameters as parameters of said reference model, and said parameters of said reference model are changed between said standstill model parameters and said running model parameters corresponding to said vehicle speed.

31. The electric power steering apparatus according to claim 27, wherein said viscoelastic model following control has standstill model parameters and running model parameters as parameters of said reference model, and said parameters of said reference model are changed between said standstill model parameters and said running model parameters corresponding to said vehicle speed.

32. The electric power steering apparatus according to claim 23, wherein said viscoelastic model following control changes parameters of said reference model corresponding to a controlled displacement calculated by multiplying a vehicle speed gain set due to said vehicle speed with said rack displacement.

33. The electric power steering apparatus according to claim 26, wherein said viscoelastic model following control changes parameters of said reference model corresponding to a controlled displacement calculated by multiplying a vehicle speed gain set due to said vehicle speed with said rack displacement.

34. The electric power steering apparatus according to claim 23, wherein said feed-back control section changes control parameters corresponding to said rack displacement.

35. The electric power steering apparatus according to claim 23, wherein said feed-back control section has standstill control parameters and running control parameters as said control parameters, and said control parameters are changed between said standstill control parameters and said running control parameters corresponding to said vehicle speed.

36. The electric power steering apparatus according to claim 34, wherein said feed-back control section has standstill control parameters and running control parameters as said control parameters, and said control parameters are changed between said standstill control parameters and said running control parameters corresponding to said vehicle speed.

37. The electric power steering apparatus according to claim 23, wherein said feed-back control section changes said control parameters corresponding to said controlled displacement.

38. The electric power steering apparatus according to claim 23, wherein said first rack axial force, said second rack axial force and said third rack axial force are respectively equivalent to a first column axial torque, a second column axial torque and a third column axial torque.

* * * * *